(12) United States Patent
Van den Keybus

(10) Patent No.: US 11,411,768 B2
(45) Date of Patent: Aug. 9, 2022

(54) METHOD AND SYSTEM FOR EXCHANGING REAL TIME DATA IN A RING NETWORK

(71) Applicant: NATIONAL INSTRUMENTS BELGIUM NV, Zaventem (BE)

(72) Inventor: Jeroen Van den Keybus, Kessel-lo (BE)

(73) Assignee: National Instruments Belgium NV, Zaventem (BE)

( * ) Notice: Subject to any disclaimer, the term of this patent is extended or adjusted under 35 U.S.C. 154(b) by 0 days.

(21) Appl. No.: 17/047,675

(22) PCT Filed: Apr. 15, 2019

(86) PCT No.: PCT/EP2019/059712
§ 371 (c)(1),
(2) Date: Oct. 14, 2020

(87) PCT Pub. No.: WO2019/201879
PCT Pub. Date: Oct. 24, 2019

(65) Prior Publication Data
US 2021/0160098 A1 May 27, 2021

(30) Foreign Application Priority Data
Apr. 15, 2018 (EP) .................................... 18167408

(51) Int. Cl.
*H04L 12/28* (2006.01)
*H04L 12/43* (2006.01)
*H04L 12/403* (2006.01)

(52) U.S. Cl.
CPC ............ *H04L 12/43* (2013.01); *H04L 12/403* (2013.01)

(58) Field of Classification Search
CPC ......... H04L 12/43; H04L 12/403; H04L 1/00; H04L 41/06; H04L 41/50; H04B 3/487; H04B 7/15
See application file for complete search history.

(56) References Cited

U.S. PATENT DOCUMENTS 9,680,525 B2 * 6/2017 Liu ...................... H04M 3/007
10,097,238 B2 * 10/2018 Tu ............................ H04B 3/32
(Continued)

FOREIGN PATENT DOCUMENTS

| | | |
|---|---|---|
| EP | 1414195 A2 | 4/2004 |
| EP | 0960509 B1 | 12/2005 |
| JP | H11112453 A | 4/1999 |

OTHER PUBLICATIONS

International Search Report and Written Opinion in International Application No. PCT/EP2019/059712, dated May 31, 2019, 13 pages.

*Primary Examiner* — Abdelnabi O Musa
(74) *Attorney, Agent, or Firm* — IPLodge bvba

(57) ABSTRACT

The invention pertains to communication among stations interconnected by a ring of physical links, operating at a base symbol rate. Each station has an upstream and a downstream link and relays messages originating from the upstream link to its downstream link. Logical links are provided on the ring, each associated with a symbol rate divisor and a link index. Each station transmits messages composed of a strings of symbols on a selected logical link by transmitting the message on its downstream link at the base symbol rate divided by the symbol rate divisor associated with the selected logical link, and offset by the link index of the selected logical link. A station generates a first synchronizing sequence on its downstream link at the base symbol rate divided by the symbol rate divisor associated with a first logical link not used for data, and offset by the (Continued)

link index of the first logical link, and a second synchronizing sequence at the base symbol rate divided by the symbol rate divisor associated with a second logical link not used for data, and offset by the link index of the second logical link.

20 Claims, 24 Drawing Sheets

(56) References Cited

U.S. PATENT DOCUMENTS

| | | | | |
|---|---|---|---|---|
| 2003/0161290 A1* | 8/2003 | Jesse | ............... | H04W 99/00 |
| | | | | 370/338 |
| 2008/0107017 A1* | 5/2008 | Yuan | ............... | H04L 41/0663 |
| | | | | 370/228 |
| 2011/0268018 A1* | 11/2011 | Wang | ............... | H04J 3/0667 |
| | | | | 370/328 |
| 2014/0029406 A1* | 1/2014 | Liang | ............... | H04J 3/10 |
| | | | | 370/201 |
| 2014/0073352 A1* | 3/2014 | Aldana | ............... | G01S 5/10 |
| | | | | 455/456.1 |
| 2014/0254511 A1* | 9/2014 | Aldana | ............... | H04W 40/244 |
| | | | | 370/329 |
| 2015/0163350 A1* | 6/2015 | Shi | ............... | H04M 11/062 |
| | | | | 379/1.03 |
| 2016/0365896 A1* | 12/2016 | Tu | ............... | H04B 3/32 |
| 2018/0295600 A1* | 10/2018 | Kumar | ............... | H04L 5/0051 |
| 2019/0098593 A1* | 3/2019 | Takeuchi | ............... | H04W 56/004 |

* cited by examiner

| time | | | | | | | | | |
|---|---|---|---|---|---|---|---|---|---|
| 0.02 µs | C1 | A3 | B1 | A2 | C0 | A1 | B0 | A0 | 0 |
| | C3 | A7 | B3 | A6 | C2 | A5 | B2 | A4 | 16 |
| | C5 | A11 | B5 | A10 | C4 | A9 | B4 | A8 | 32 |
| 1.02 µs | C7 | A15 | B7 | A14 | C6 | A13 | B6 | A12 | 48 |
| 1.04 µs | C9 | A19 | B9 | A18 | C8 | A17 | B8 | A16 | 64 |
| | C11 | A23 | B11 | A22 | C10 | A21 | B10 | A20 | 80 |
| | C13 | A27 | B13 | A26 | C12 | A25 | B12 | A24 | 96 |
| 2.05 µs | C15 | A31 | B15 | A30 | C14 | A29 | B14 | A28 | 112 |
| 2.06 µs | C17 | A35 | B17 | A34 | C16 | A33 | B16 | A32 | 128 |
| | C19 | A39 | B19 | A38 | C18 | A37 | B18 | A36 | 144 |
| | C21 | A43 | B21 | A42 | C20 | A41 | B20 | A40 | 160 |
| 3.07 µs | C23 | A47 | B23 | A46 | C22 | A45 | B22 | A44 | 176 |
| 3.09 µs | C25 | A51 | B25 | A50 | C24 | A49 | B24 | A48 | 192 |
| | C27 | A55 | B27 | A54 | C26 | A53 | B26 | A52 | 208 |
| | C29 | A59 | B29 | A58 | C28 | A57 | B28 | A56 | 224 |
| 4.10 µs | C31 | A63 | B31 | A62 | C30 | A61 | B30 | A60 | 240 |

Fig. 42

| 0 | 2 | 000h |
|---|---|---|
| 0 | -1 | 001h |
| 0 | 3 | 002h |
| 0 | -1 | 003h |
| 0 | 2 | 004h |
| 0 | -1 | 005h |
| 0 | 3 | 006h |

| 0 | -1 | 039h |
|---|---|---|
| 0 | 3 | 03Ah |
| 0 | -1 | 03Bh |
| 0 | 2 | 03Ch |
| 0 | -1 | 03Dh |
| 0 | 3 | 03Eh |
| 0 | -1 | 03Fh |

Fig. 43

| time | | | | | | | | | | | | | | | | | |
|---|---|---|---|---|---|---|---|---|---|---|---|---|---|---|---|---|---|
| 0.02 µs | A15 | A14 | A13 | A12 | A11 | A10 | A9 | A8 | A7 | A6 | A5 | A4 | A3 | A2 | A1 | A0 | 0 |
| | C7 | C6 | C5 | C4 | C3 | C2 | C1 | C0 | B7 | B6 | B5 | B4 | B3 | B2 | B1 | B0 | 16 |
| | | | | | | | | | | | | | | | | | 32 |
| 1.02 µs | | | | | | | | | | | | | | | | | 48 |
| 1.04 µs | A31 | A30 | A29 | A28 | A27 | A26 | A25 | A24 | A23 | A22 | A21 | A20 | A19 | A18 | A17 | A16 | 64 |
| | C15 | C14 | C13 | C12 | C11 | C10 | C9 | C8 | B15 | B14 | B13 | B12 | B11 | B10 | B9 | B8 | 80 |
| | | | | | | | | | | | | | | | | | 96 |
| 2.05 µs | | | | | | | | | | | | | | | | | 112 |
| 2.06 µs | A47 | A46 | A45 | A44 | A43 | A42 | A41 | A40 | A39 | A38 | A37 | A36 | A35 | A34 | A33 | A32 | 128 |
| | C23 | C22 | C21 | C20 | C19 | C18 | C17 | C16 | B23 | B22 | B21 | B20 | B19 | B18 | B17 | B16 | 144 |
| | | | | | | | | | | | | | | | | | 160 |
| 3.07 µs | | | | | | | | | | | | | | | | | 176 |
| 3.09 µs | A63 | A62 | A61 | A60 | A59 | A58 | A57 | A56 | A55 | A54 | A53 | A52 | A51 | A50 | A49 | A48 | 192 |
| | C31 | C30 | C29 | C28 | C27 | C26 | C25 | C24 | B31 | B30 | B29 | B28 | B27 | B26 | B25 | B24 | 208 |
| | | | | | | | | | | | | | | | | | 224 |
| 4.10 µs | | | | | | | | | | | | | | | | | 240 |

Fig. 44

| time | col1 | col2 | # |
|---|---|---|---|
| 0.02 μs | A(15..8) | A(7..0) | 0 |
|  | C(7..0) | B(7..0) | 2 |
|  |  |  | 4 |
| 1.02 μs |  |  | 6 |
| 1.04 μs | A(31..24) | A(23..16) | 8 |
|  | C(15..8) | B(15..8) | 10 |
|  |  |  | 12 |
| 2.05 μs |  |  | 14 |
| 2.06 μs | A(47..40) | A(39..32) | 16 |
|  | C(23..16) | B(23..16) | 18 |
|  |  |  | 20 |
| 3.07 μs |  |  | 22 |
| 3.09 μs | A(63..56) | A(55..48) | 24 |
|  | C(31..24) | B(31..24) | 26 |
|  |  |  | 28 |
| 4.10 μs |  |  | 30 |

Fig. 45

| time | col1 | col2 | # |
|---|---|---|---|
| 0.03 μs | A(15..8) | A(7..0) | 0 |
|  | A(31..24) | A(23..16) | 2 |
|  | B(15..8) | B(7..0) | 4 |
| 2.05 μs | C(15..8) | C(7..0) | 6 |
| 2.08 μs | A(47..40) | A(39..32) | 8 |
|  | A(63..56) | A(55..48) | 10 |
|  | B(31..24) | B(23..16) | 12 |
| 4.10 μs | C(31..24) | C(23..16) | 14 |
| 4.13 μs | A(79..72) | A(71..64) | 16 |
|  | A(95..88) | A(87..80) | 18 |
|  | B(47..40) | B(39..32) | 20 |
| 6.14 μs | C(47..40) | C(39..32) | 22 |
| 6.18 μs | A(111..104) | A(103..96) | 24 |
|  | A(127..120) | A(119..112) | 26 |
|  | B(63..56) | B(55..48) | 28 |
| 8.19 μs | C(63..56) | C(55..48) | 30 |

| time | col1 | col2 | # |
|---|---|---|---|
| 0.03 μs | A(15..8) | A(7..0) | 0 |
| 1.02 μs | C(7..0) | B(7..0) | 2 |
| 1.06 μs | A(31..24) | A(23..16) | 4 |
| 2.05 μs | C(15..8) | B(15..8) | 6 |
| 2.08 μs | A(47..40) | A(39..32) | 8 |
| 3.07 μs | C(23..16) | B(23..16) | 10 |
| 3.10 μs | A(63..56) | A(55..48) | 12 |
| 4.10 μs | C(31..24) | B(31..24) | 14 |
| 4.13 μs | A(79..72) | A(71..64) | 16 |
| 5.12 μs | C(39..32) | B(39..32) | 18 |
| 5.15 μs | A(95..88) | A(87..80) | 20 |
| 6.14 μs | C(47..40) | B(47..40) | 22 |
| 6.18 μs | A(111..104) | A(103..96) | 24 |
| 7.17 μs | C(55..48) | B(55..48) | 26 |
| 7.20 μs | A(127..120) | A(119..112) | 28 |
| 8.19 μs | C(63..56) | B(63..56) | 30 |

Fig. 46

XC stream input: A0 - B0 - A1 - C0 - A2 - B1 - A3 - C1 - A4 - B2 - A5 - C2 - A6 - B3 - A7 - C3

Channel 2 delayed by 1: C3 - A0 - B0 - A1 - C0 - A2 - B1 - A3 - C1 - A4 - B2 - A5 - C2 - A6 - B3 - A7

Fig. 47

XC stream input: A0 - B0 - A1 - C0 - A2 - B1 - A3 - C1 - A4 - B2 - A5 - C2 - A6 - B3 - A7 - C3

Channel 2 delayed by 2: A7 - C3 - A0 - B0 - A1 - C0 - A2 - B1 - A3 - C1 - A4 - B2 - A5 - C2 - A6 - B3

Fig. 48

| Time | | | | | |
|---|---|---|---|---|---|
| 0.02 μs | C(3..0) | B(3..0) | A(7..4) | A(3..0) | 0 |
| 0.51 μs | | | | | 4 |
| 0.53 μs | C(7..4) | B(7..4) | A(15..12) | A(11..8) | 8 |
| 1.02 μs | | | | | 12 |
| 1.04 μs | C(11..8) | B(11..8) | A(23..20) | A(19..16) | 16 |
| 1.54 μs | | | | | 20 |
| 1.55 μs | C(15..12) | B(15..12) | A(31..28) | A(27..24) | 24 |
| 2.05 μs | | | | | 28 |
| 2.06 μs | C(16..19) | B(16..19) | A(39..36) | A(35..32) | 32 |
| 2.56 μs | | | | | 36 |
| 2.58 μs | C(23..20) | B(23..20) | A(47..44) | A(43..40) | 40 |
| 3.07 μs | | | | | 44 |
| 3.09 μs | C(27..24) | B(27..24) | A(55..52) | A(51..48) | 48 |
| 3.58 μs | | | | | 52 |
| 3.60 μs | C(31..28) | B(31..28) | A(63..60) | A(59..56) | 56 |
| 4.10 μs | | | | | 60 |

| Ch. | Rate [bit/s] | Init | Delay [bits] | Input | Output | Additional information |
|---|---|---|---|---|---|---|
| 0110h | 4M | | -8 | M3 | | 24-bit current measurement from device 4 |
| 0190h | 4M | | -8 | M4 | | 24-bit voltage measurement from device 4 |
| 0170h | 4M | | | | EG1 | 12-bit event channel to device 2 |
| 01F0h | 4M | | | | EG2 | 12-bit event channel to device 3 |
| 0200h | 2M | x | | | LS1/2.1.M | MMF link sync. and index symbol |
| 0201h | 2M | x | | | LS1/2.2.M | MMF link sync. and index symbol |
| 0202h | 2M | x | | | LS1/2.3.M | MMF link sync. and index symbol |
| 0203h | 2M | x | | | LS1/2.4.M | MMF link sync. and index symbol |
| 0204h | 2M | x | | | LS1/2.5.M | MMF link sync. and index symbol |
| 0205h | 2M | x | | | LS1/2.6.M | MMF link sync. and index symbol |
| 0206h | 2M | x | | | LS1/2.7.M | MMF link sync. and index symbol |
| 0207h | 2M | x | | | LS1/2.8.M | MMF link sync. and index symbol |
| 0280h | 2M | x | | | LR1.M | MMF link rate control symbol |
| 0300h | 2M | x | | | LR2.M | MMF link rate control symbol |
| 0380h | 2M | x | | | LR3.M | MMF link rate control symbol |
| 0301h | 2M | | 0 | LBC.M.3 | LBC.M.1 | Local bus control in MMF XC ring |
| 0240h | 2M | x | | | LS1.P | POF link sync. symbol |
| 0220h | 2M | x | | | LS2.P | POF link index symbol |
| 0250h | 2M | | 0 | M1 | | 11-bit current measurement from device 2 |
| 0350h | 2M | | 0 | M2 | | 11-bit voltage measurement from device 3 |
| 02C0h | 2M | x | | | LR1.P | POF link rate control symbol |
| 0340h | 2M | x | | | LR2.P | POF link rate control symbol |
| 03C0h | 2M | x | | | LR3.P | POF link rate control symbol |
| 02A0h | 2M | | -8 | LBC.P1.2 | LBC.P1.1 | Local bus control in POF XC ring 1 |
| 03A0h | 2M | | -4 | LBC.P2.2 | LBC.P2.1 | Local bus control in POF XC ring 2 |
| 03B0h | 2M | | | | EVH | 10-bit event channel (8 ns resolution) |
| 0A30h | 500k | | -1 | SFD.4 | SFD.1 | Secure Fault Detection chain channel |
| 0B30h | 500k | | | | EVL | 4-bit event channel (for 0.5 ns res.) |
| 0E30h | 500k | | | SFR | | Secure Fault Report channel |
| 1030h | 250k | x | | | LS1.C | POF link sync. symbol |
| 1830h | 250k | x | | | LS2.C | POF link index symbol |
| 1C30h | 250k | | -2 | LBC.C.3 | LBC.C.1 | Local bus control in FCC/TPC XC ring |
| 2430h | 125k | | -1 | RT1 return | RT1 | Local real-time control for device 2 |
| 3430h | 125k | | -1 | RT2 return | RT2 | Local real-time control for device 3 |

Figure 55

| From 'mmf' | To 'pof1' | Routed channels |
|---|---|---|
| 070h | 0Ah | EG1, EG2, EVH, EVL, SFD.1, SFR, LS1.C, LS2.C, LBC.C.1, RT1, RT2 |
| 0C0h | 10h | LS1.P, LR1.P, LR2.P, LR3.P |
| 2A0h | 68h | LBC.P1.1 |
| 220h | 48h | LS2.P |

| From 'pof1' | To 'mmf' | Routed channels |
|---|---|---|
| 068h | 2A0h | LBC.P1.2 |
| 142h | A30h | SFD.3 |
| 032h | 150h | M1, M2 |
| 182h | C30h | LBC.C.3, RT1, RT2 |

Figure 56

| From 'pof1' | To 'fcc' | Routed channels |
|---|---|---|
| 0Ah | 01h | EG1, EG2, EVH, EVL, SFD.1, SFR, LS1.C, LS2.C, LBC.C.1, RT1, RT2 |

| From 'fcc' | To 'pof1' | Routed channels |
|---|---|---|
| 06h | 032h | M1, M2 |
| 18h | 0C2h | SFD.3 (SFR) |
| 30h | 182h | LBC.C.3, RT1, RT2 |

Figure 57

| Ch. | Rate [bit/s] | Input | Output |
|---|---|---|---|
| 05h | 4M | EG1 (2x 12 bits event + 6 SECDED) | (passthrough) |
| 07h | 4M | EG2 (2x 12 bits event + 6 SECDED) | (passthrough) |
| 0Ah | 2M | | M1 (11 bits + 5 SECDED) |
| 0Eh | 2M | EVH (10 bits event + 5 SECDED) | (passthrough) |
| 28h | 500k | SFD.1 | SFD.2 (modified) |
| 38h | 500k | SFR | (passthrough) |
| 40h | 250k | LS1.C | (passthrough) |
| 60h | 250k | LS2.C | (passthrough) |
| 70h | 250k | LBC.C.1 | LBC.C.2 (modified) |
| 90h | 125k | RT1 | RT1 (modified) |

| From 'mmf' | To 'pof2' | Routed channels |
|---|---|---|
| 0B0h | 12h | EVH, EVL, SFD.3, SFR, (LS1.C), (LS2.C), (LBC.C.3), (RT1), (RT2) |
| 0C0h | 10h | LS1.P, LR1.P, LR2.P, LR3.P |
| 3A0h | 68h | LBC.P2.1 |
| 220h | 48h | LS2.P |
| From 'pof2' | To 'mmf' | Routed channels |
| 01Ah | 090h | M3, M4 |
| 068h | 3A0h | LBC.P2.2 |
| 142h | A30h | SFD.4 |

Figure 60

| Ch | Rate [bit/s] | Input | Output |
|---|---|---|---|
| 02Ah | 4M | | M3 (26 bits + 6 SECDED, load current) |
| 03Ah | 4M | | M4 (26 bits + 6 SECDED, load voltage) |
| 040h | 2M | LS1.P | (pass-through) |
| 048h | 2M | LS2.P | (pass-through) |
| 068h | 2M | LBC.P2.1 | LBC.P2.2 (modified) |
| 050h | 2M | LR1.P | (pass-through) |
| 060h | 2M | LR2.P | (pass-through) |
| 070h | 2M | LR3.P | (pass-through) |
| 072h | 1M | EVH (10 bits event + 5 SECDED) | (pass-through) |
| 162h | 500k | EVL (4 additional event bits) | (pass-through) |
| 142h | 500k | SFD.3 | SFD.4 (modified) |
| 1C2h | 500k | SFR | (pass-through) |

Figure 61

METHOD AND SYSTEM FOR EXCHANGING REAL TIME DATA IN A RING NETWORK

FIELD OF THE INVENTION

The present invention pertains to the field of real-time data communication systems, in particular those systems used to provide communication between the components of an electric energy conversion system.

BACKGROUND

Electric energy conversion systems have multiple ports connecting electric power sources and loads, and consist of one or more power electronic converters. It is known to use a central digital data processing unit for the control of such systems, which runs multiple control algorithms accessing the converter measurements and power semiconductor gate drivers at the same time. Since the control algorithms are running as parallel processes on the same control unit, communication between these processes is fast and reliable, facilitating system design and improving system performance and reliability.

To the control unit, both measurements and gate drivers are peripherals located at some distance due to the physical size of the converters. As bus technology progresses, the impact of the electrical load of additional bus nodes is not negligible and the direct connection of peripherals to the control unit system bus must be avoided. Therefore, even in compact, integrated power conversion systems, the control unit is increasingly connected to the peripherals using a digital data network, or, as it is commonly referred to, a field bus.

However, most, if not all, data network technologies are designed for the transfer of information in packets, as a result of which additional software is needed to schedule the packet transfers to avoid concurrent access to the data network by multiple processes or peripherals. Routing packets across network links with different speeds requires intelligent hubs with temporary packet storage. The access protocols to a packet based network also impose relatively complex hardware requirements on the peripherals. These aspects of packet based network technologies are disadvantages when these technologies are used to provide a field bus in electric energy conversion system.

It is an object of embodiments of the present invention to overcome at least some of the disadvantages of the known systems.

International patent application publication no. WO 98/036533 A1 (EP 0960509 A1), in the name of Communication & Control Electronics Limited, discloses examples of local communication systems, based on a ring of point-to-point links, providing for transport of fixed rate synchronous, fixed rate asynchronous data and variable rate data in a flexible format. Different segments of the ring network can carry data at different bit rates, while remaining synchronized to a common frame rate and having a common control channel structure, for compatibility with earlier systems. Parallel channels are provided, either permanently or when required, for signaling errors of source data, data validity/padding, flow control. Parallel variable width channels are defined with free content (stream or packet). Null data symbols are defined for padding on a byte-by-byte basis. The allocation of capacity among variable width channels is revised block by block, and a transition period is defined to allow for ring latency. Calculations for allocations of capacity are performed during one block for the next block, locally at each source station, according to predetermined rules. Information as to bandwidth requirements is exchanged prior to the calculation via a special connection signaling channel and message format.

SUMMARY

According to an embodiment of the present invention, there is provided a real-time data communication system comprising a plurality of stations communicatively interconnected by a set of physical links forming a ring, operating at a base symbol rate, such that each of the stations has a physical upstream link and a physical downstream link and is configured to relay symbols received on its upstream link and originating from a different station to its downstream link; wherein a plurality of logical links are provided on the ring, each of the logical links being associated with a symbol rate divisor from among a set of symbol rate divisors and a link index, wherein said set of symbol rate divisors comprises only powers of 2; wherein each of the stations is configured to transmit a message represented by a first string of symbols on a selected logical link from among the plurality of logical links by transmitting the message on its downstream link at the base symbol rate divided by the symbol rate divisor associated with the selected logical link, and offset by the link index of the selected logical link; wherein at least one of the stations is configured to generate a first synchronizing sequence by transmitting a predetermined repetitive sequence of symbols on its downstream link at the base symbol rate divided by the symbol rate divisor associated with a first logical link not used for data transmission, and offset by the link index of the first logical link not used for data transmission, and to generate a second synchronizing sequence by transmitting encoded representations of a running symbol counter value on its downstream link at the base symbol rate divided by the symbol rate divisor associated with a second logical link not used for data transmission, and offset by the link index of the second logical link not used for data transmission; and wherein each of the stations is further configured to retrieve symbols belonging to a specific logical link from among a stream of symbols received on its upstream physical link by determining using the first and second synchronizing sequences, a link symbol index for each of the received symbols and then selecting only those symbols for which the determined link symbol index has a remainder equal to the link index of the desired logical link when divided by the symbol rate divisor associated with the desired logical link.

It is an advantage of the invention that it provides a communication technology that can be used for real-time communication in multiple streams between multiple stations, without requiring packetization and depacketization of the data, thus rendering it more suitable for use as a field bus protocol in an electric energy conversion system.

It is a further advantage of the invention that the claimed system may be implemented using a combination of a number of expensive, sensitive but fast network links, and a number of low-cost EMI-resistant and relatively slow network links.

It is yet a further advantage of the invention that the claimed system may have its device interfaces, implementing the data exchange protocol, integrated in a power semiconductor switch (preferably in the same package) or in a robust, ruggedized sensor that is subject to extreme environmental conditions, including extreme temperatures and strong electromagnetic fields.

It is yet a further advantage of the invention that by using $M=2^N$, whereby M is the modulus acting as the symbol rate divisor and N is an integer, it is possible to unambiguously specify a channel with only one integer number instead of an (M, R)-tuple. Another advantage of the use of $M=2^N$ is that it significantly facilitates the detection of bits in a logical link (channel) and the recovery of the channel bit index.

In an embodiment of the real-time data communication system according to the present invention, each of the stations is further configured to retrieve symbols belonging to a specific logical link from among a stream of symbols received on its upstream physical link, by determining a link symbol index for each of the received symbols and selecting only those symbols for which the determined link symbol index has a remainder equal to the link index of the desired logical link when divided by the symbol rate divisor associated with the desired logical link; and the determining of the link symbol index comprises: detecting the first synchronizing sequence so as to obtain a reference point for offsets used to distinguish logical links; using the reference point for detecting the second synchronizing sequence so as to obtain the encoded representations of the running symbol counter value; and decoding the encoded representations of the running symbol counter value to retrieve the link symbol index.

It is an advantage of this embodiment that it provides an efficient and reliable manner to synchronize and recover individual channels from a stream of incoming symbols.

In an embodiment of the real-time data communication system according to the present invention, the symbols are binary symbols.

It is an advantage of this embodiment that it integrates seamlessly in most modern digital infrastructures, which are based on binary representations of data.

In an embodiment, the real-time data communication system according to the present invention further comprises reversibly transforming the first string of symbols into a second string of symbols, the second string of symbols having higher entropy than the first string of symbols and the transmitting of the message comprises transmitting the second string of symbols.

The transforming may comprise encrypting and/or scrambling the first string of symbols.

While in other embodiments, the first string of symbols is directly transmitted, which is possible when said first string of symbols is inherently suitable for recovery of synchronization, it is an advantage of this embodiment that an adequate degree of randomness of the transmitted symbol stream required for the channel synchronization process is introduced in an efficient and even useful manner.

In an embodiment of the real-time data communication system according to the present invention, at least one of said stations is a host configured to store a stream of symbols received on its upstream physical link in a host buffer, and to apply an address translation table to said stored symbols so as to improve the spatial distribution of symbols belonging to selected logical links.

It is an advantage of this embodiment that it facilitates the reading of individual selected logical links (channels) from the host buffer. This process is particularly advantageous when applied to channels with $M=2^N$, whereby M is the modulus acting as the symbol rate divisor, and N is an integer.

In an embodiment of the real-time data communication system according to the present invention, at least one of said stations is a host configured to read a stream of symbols from a host buffer for transmission on its downstream physical link, and to apply an address translation table to said read symbols so as to selectively combine symbols belonging to selected logical links.

It is an advantage of this embodiment that it facilitates the writing of individual selected logical links (channels) to the host buffer. This process is particularly advantageous when applied to channels with $M=2^N$, whereby M is the modulus acting as the symbol rate divisor, and N is an integer.

In an embodiment of the real-time communication system according to the present invention, the real-time communication system corresponds to an electric energy conversion system comprising a central digital data processing unit, at least one power electronic converter, and a plurality of ports for connecting electric power sources and loads; wherein said central digital data processing unit is connected to said at least one power electronic converter and said plurality of ports by means of a set of physical links forming a ring; and wherein said central digital data processing unit, said at least one power electronic converter, and said plurality of ports are configured to operate as said plurality of stations of the real-time data communication system.

According to an aspect of the present invention, there is provided an electric energy conversion system comprising a central digital data processing unit, at least one power electronic converter, and a plurality of ports for connecting electric power sources and loads; wherein the central digital data processing unit is connected to the at least one power electronic converter and the plurality of ports by means of a set of physical links forming a ring; wherein the central digital data processing unit, the at least one power electronic converter or internal components of said at least one power electronic converter, and the plurality of ports are configured to operate as the plurality of stations in the real-time data communication system as described above.

According to an aspect of the present invention, there is provided a method for exchanging data in a real-time data communication system comprising a plurality of stations communicatively interconnected by a set of physical links forming a ring, operating at a base symbol rate, such that each of the stations has a physical upstream link and a physical downstream link and relays symbols received on its upstream link and originating from a different station to its downstream link, wherein a plurality of logical links are provided on the ring, each of the logical links being associated with a symbol rate divisor from among a set of symbol rate divisors and a link index, wherein the set of symbol rate divisors comprises only powers of 2; the method comprising: at each of the stations having a message represented by a first string of symbols to be transmitted on a selected logical link from among the plurality of logical links, transmitting the message on its downstream link at the base symbol rate divided by the symbol rate divisor associated with the selected logical link, and offset by the link index of the selected logical link; at least a first one of the stations: generating a first synchronizing sequence by transmitting a predetermined repetitive sequence of symbols on its downstream link at the base symbol rate divided by the symbol rate divisor associated with a first logical link not used for data transmission, and offset by the link index of the first logical link not used for data transmission, and generating a second synchronizing sequence by transmitting encoded representations of a running symbol counter value on its downstream link at the base symbol rate divided by the symbol rate divisor associated with a second logical link not used for data transmission, and offset by the link index of the second logical link not used for data transmission; and at least a second one of the stations: retrieving symbols belonging to a specific logical link from among a stream of symbols received on its upstream physical link by determining using the first and second synchronizing sequences, a link symbol index for each of the received symbols and then selecting only those symbols for which the determined link symbol index has a remainder equal to the link index of the desired logical link when divided by the symbol rate divisor associated with the desired logical link.

In an embodiment, the method according to the present invention further comprises retrieving symbols belonging to a specific logical link from among a stream of symbols received on an upstream physical link, by determining a link symbol index for each of the received symbols and selecting only those symbols for which the determined link symbol index has a remainder equal to the link index of the desired logical link when divided by the symbol rate divisor associated with the desired logical link; wherein the determining of the link symbol index comprises: detecting the first synchronizing sequence so as to obtain a reference point for offsets used to distinguish logical links; using the reference point for detecting the second synchronizing sequence so as to obtain the encoded representations of the running symbol counter value; and decoding the encoded representations of the running symbol counter value to retrieve the link symbol index.

In an embodiment of the method according to the present invention, the symbols are binary symbols.

In an embodiment of the method according to the present invention, the transforming comprises encrypting and/or scrambling the first string of symbols.

In an embodiment, the method according to the present invention further comprises, at least one of said stations that acts as a host: storing a stream of symbols received on its upstream physical link in a host buffer, and applying an address translation table to said stored symbols so as to improve the spatial distribution of symbols belonging to selected logical links.

In an embodiment, the method according to the present invention further comprises, at least one of said stations that acts as a host: reading a stream of symbols from a host buffer for transmission on its downstream physical link, and applying an address translation table to said read symbols so as to selectively combine symbols belonging to selected logical links.

In an embodiment of the method according to the present invention, the real-time data communication system corresponds to an electric energy conversion system comprising a central digital data processing unit, at least one power electronic converter, and a plurality of ports for connecting electric power sources and loads, said central digital data processing unit being connected to said at least one power electronic converter and said plurality of ports by means of a set of physical links forming a ring, wherein said central digital data processing unit, said at least one power electronic converter or internal components of said at least one power electronic converter, and said plurality of ports are configured to operate as said plurality of stations.

According to an aspect of the present invention, there is provided a use of the real-time data communication system as described above for controlling an electric energy conversion system comprising a central digital data processing unit, at least one power electronic converter, and a plurality of ports for connecting electric power sources and loads, the central digital data processing unit being connected to the at least one power electronic converter and the plurality of ports by means of a set of physical links forming a ring, wherein the central digital data processing unit, the at least one power electronic converter or internal components of said at least one power electronic converter, and the plurality of ports are configured to operate as the plurality of stations.

According to an aspect of the present invention, there is provided a computer program product comprising code means configured to cause a processor, when executed, to perform the function of any of the stations of the method as described above.

The computer program product may be stored on a computer-readable medium such as a magnetic disc, an optical disc, a semiconductor memory, or the like.

The technical effects and advantages of embodiments of the electric energy conversion system, the method, the use, and the computer program product according to the present invention correspond mutatis mutandis to those of embodiments of the system according to the present invention.

BRIEF DESCRIPTION OF THE FIGURES

These and other features and advantages of embodiments of the present invention will now be described with reference to the enclosed drawings, in which:

FIG. 27 illustrates the mapping of an exemplary composite channel C on a host buffer using 2 section buffers;

FIG. 28 schematically illustrates poor alignment of channel A and B data in a host buffer;

FIG. 29 illustrates straight XC channel index mapping to the section buffer;

FIG. 30 illustrates XC channel index mapping using a bit address translation table for improved channel alignment in the section buffer;

FIG. 41 presents host buffers without channel bit index translation;

FIG. 42 presents an exemplary routing table;

FIG. 43 present host buffers with channel bit index translation;

FIG. 44 provides a more compact representation of the host buffer layout;

FIG. 45 presents mappings of XC composite channel 2 for section sizes 64 (left) and 32 (right);

FIG. 46 presents an exemplary XC stream with channel 2 delayed by 1 bit;

FIG. 47 presents an exemplary XC stream with channel 2 delayed by 2 bits;

FIG. 48 illustrates an exemplary scattered mapping of XC channel 1 using 32 bit sections;

FIG. 55 is a table representing translation table (T) definitions for the controller host interface;

FIG. 56 is a table representing routing table (R) definitions for rate transition blocks 'rtb1up' and 'rtb1dn';

FIG. 57 is a table representing routing table (R) definitions for rate transition blocks 'rtb3up' and 'rtb3dn';

FIG. 60 is a table representing routing table (R) definitions for rate transition blocks 'rtb2up' and 'rtb2dn'; and FIG. 61 is a table presenting XC channel allocations for device 'dev4'.

DESCRIPTION OF EMBODIMENTS

Overview

Figure 1:
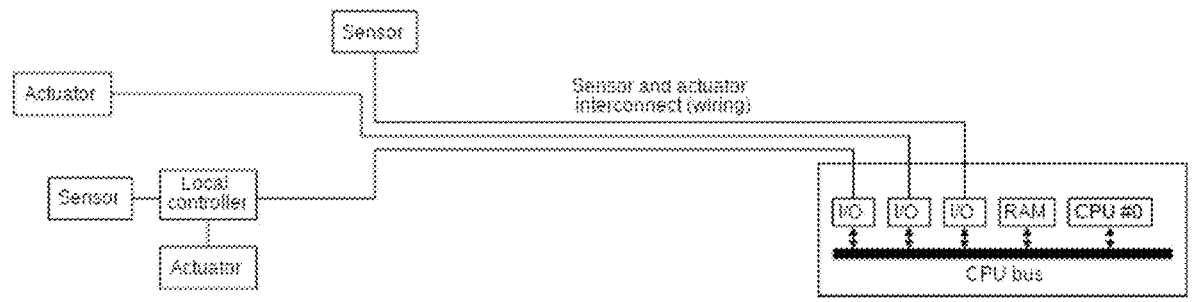
FIG. 1 represents a system in which a computer program is used to implement a control law between a set of sensors and actuators.

The present invention pertains to a real-time data communication system comprising a plurality of stations communicatively interconnected by a set of physical links forming a ring, operating at a base symbol rate, such that each of the stations has a physical upstream link and a physical downstream link and relays symbols received on its upstream link and originating from a different station to its downstream link; wherein a plurality of logical links are provided on the ring, each of the logical links being associated with a symbol rate divisor from among a set of symbol rate divisors and a link index; wherein each of the stations is configured to transmit a message composed of a first string of symbols on a selected logical link from among the plurality of logical links by transmitting the message on its downstream link at the base symbol rate divided by the symbol rate divisor associated with the selected logical link, and offset by the link index of the selected logical link; wherein at least one of the stations is configured to generate a first synchronizing sequence by transmitting a predetermined repetitive sequence of symbols on its downstream link at the base symbol rate divided by the symbol rate divisor associated with a first logical link not used for data transmission, and offset by the link index of the first logical link not used for data transmission, and to generate a second synchronizing sequence by transmitting encoded representations of a running symbol counter value on its downstream link at the base symbol rate divided by the symbol rate divisor associated with a second logical link not used for data transmission, and offset by the link index of the second logical link not used for data transmission.

The present invention also pertains to a method for exchanging data in a real-time data communication system comprising a plurality of stations communicatively interconnected by a set of physical links forming a ring, operating at a base symbol rate, such that each of the stations has a physical upstream link and a physical downstream link and relays symbols received on its upstream link and originating from a different station to its downstream link, wherein a plurality of logical links are provided on the ring, each of the logical links being associated with a symbol rate divisor from among a set of symbol rate divisors and a link index; the method comprising: at each of the stations having a message composed of a first string of symbols to be transmitted on a selected logical link from among the plurality of logical links: transmitting the message on its downstream link at the base symbol rate divided by the symbol rate divisor associated with the selected logical link, and offset by the link index of the selected logical link; at least one of the stations: generating a first synchronizing sequence by transmitting a predetermined repetitive sequence of symbols on its downstream link at the base symbol rate divided by the symbol rate divisor associated with a first logical link not used for data transmission, and offset by the link index of the first logical link not used for data transmission, and generating a second synchronizing sequence by transmitting encoded representations of a running symbol counter value on its downstream link at the base symbol rate divided by the symbol rate divisor associated with a second logical link not used for data transmission, and offset by the link index of the second logical link not used for data transmission.

The invention will be described hereinafter, without loss of generality, in the specific context of an electric power conversion system, the control unit(s) and peripheral(s) of which are the stations of the system as described above. More in particular, the stations may include a central digital data processing unit, at least one power electronic converter, and a plurality of ports for connecting electric power sources and loads. A set of physical links forming a ring acts as a field bus for these peripherals. The system according to the invention, as used in this specific context, will be referred to as the "XC system". The skilled person will appreciate that the field of application of the invention is not limited to the illustrated context, and that any features and advantages disclosed herein with reference to the "XC system" also apply to other fields of use.

The invention will be described hereinafter, without loss of generality, with reference to systems that use bits as symbols; accordingly, the symbol rate mentioned above will be illustrated as a bit rate and the symbol counter mentioned above will be illustrated as a bit counter. The skilled person will appreciate that the principles of the invention apply to communication based on other symbol sets as well.

The invention will be described hereinafter, without loss of generality, with reference to systems that use scrambling to transform a first string of symbols into a second string of symbols having higher entropy than the first string of symbols. The term "entropy" refers to the randomness of the symbols, whereby, in a binary system, the goal is to approach a bit distribution in which the frequency of "1" bits equals the frequency of "0" bits (i.e., 50% occurrence of both).

Embodiments of the present invention solve some of the issues of the prior art by defining fixed bit rate channels and multiplexing them on a network link at the bit level in the time domain. The exclusive use of relative bit rates that are a power of 2 allows the definition of an integer channel address, channel forwarding across different link speeds without buffers and network access by peripherals with minimal hardware requirements.

Embodiments of the present invention turn the packet scheduling problem into a channel allocation problem, which is much easier to solve because, with a power-of-2 bit rate relationship, the valid channel configurations on a network link can be represented by a binary tree.

Embodiments of the present invention use a wide (e.g. 64-bit) binary representation of the position of a bit in a network link, i.e. the link bit index, to determine, using simple digital comparison logic, whether or not a bit belongs to a channel. Since the link bit index is unavailable after transmission of the bit sequence, embodiments of the present invention provide a method to encode and recover it. The innovative aspect of the present invention is that it actually uses channels to do this, thereby ensuring that the synchronization mechanism does not interfere with the regular data transfer.

Either data scrambling or bit encoding—when available—may be used to detect one specific channel in the sequence and, based on the position of its bits, data in a second channel is subsequently used to recover the position information of all other bits in the network link. The bit position in the network link sequence is called the link bit index.

The most significant link bit index bits, i.e. the link index bits to the left of the bits identifying the channel, also uniquely identify all bits inside the channel, allowing these bits to be aligned to word boundaries, removing the need for bit encoding in the individual channels. In other words, embodiments of the present invention allow alignment of data words in hundreds or thousands of channels using one, shared link bit index.

Embodiments of the present invention also provide a method to adjust the effective bit rate of a network link. Additional bits are inserted in the network link sequence and, again, one or more channels are used to indicate the presence of these 'stuff bits'. Special measures are taken to ensure that this rate control mechanism does not interfere with the link bit index recovery.

Using effective bit rate control, a network station can forward network link bit sequences continuously, and the link index bits can also be used as a system-wide time base. Instead of deriving the delays between network stations at run-time using a state-of-art protocol, embodiments of the present invention characterize the network station delay once and uses these known delays to adjust the local link bit index to the actual system time.

Because the channel bit occurrences are periodic in the network link bit sequence, (in fact, they can be off-period by at most one channel bit due to the stuff bits), they can be immediately forwarded to another network link operating at lower speed. By proper selection of the channel bit rate, transitions from a fast to a slower network link (and back) can be implemented with minimal hardware requirements.

In many practical cases a slower network link also needs a combination of channels, some of which may be shared with other slower links. Even in that case, a simple buffer memory and configurable look-up table are sufficient to perform the rate transition, allowing peripherals to interface with embodiments of the present invention using cost-effective technology that is optimized for high temperature and high interference levels, instead of speed.

Eventually, the data bits of a significant number of channels must be accessible by software algorithms running on the control unit's processors. The most efficient way to provide access to fast state-of-art microprocessors with cache memories is to use a shared memory area.

The direct storage of the network link bit sequence by a network interface device in a preallocated control unit memory area would be inefficient because the channel bits are scattered and, subsequently, many microprocessor memory accesses and instructions would be needed to reassemble the individual bits related to a channel.

To solve this issue, embodiments of the present invention reorder the bits within sections of a fixed number of bits, which must be a power of 2. Together with the bit rate constraint, the section size constraint enables the use of a straightforward address bit transformation from each bit's link bit index to the bit index in the section. For each bit, the required transformation only depends on the channel bit rate, allowing a look-up table with a number of entries equal to the section size, but a limited width (e.g. only 4 for 16 bit rates). The transformation only applies to the address bits covering the section; the higher order link bit index bits are used unchanged to determine where the section is written in the control unit's memory buffer. Unless a software variable offset is used, this requires the memory buffer to have a size that is also a power of 2. In this case, the natural overflow of the link bit index effectively creates a circular buffer.

Limited memory requirements are preferred since each network interface may have to support multiple control unit memory areas at the same time, each corresponding to a composite channel (a channel consisting of a set of native data channels). Otherwise, the full network link bandwidth must always be decoded, which, in the case of gigabit network links, could require more bandwidth than available on the control unit peripheral bus. Incidentally, the use of sections is also required for efficient data transfer to the control unit's shared memory.

Digital Process Control

In digital process control, a computer program is used to implement a control law between a set of sensors and actuators. A representation of such a system is given in FIG. 1. In this example, one sensor and one actuator is connected using wires to peripheral input/output (I/O) devices in a main controller with a single central processing unit (CPU).

A second actuator is controlled by a local controller, based on measurements from a second sensor. The main controller communicates with the local controller using a dedicated I/O card.

A significant disadvantage is the long interconnect; it represents a high installation cost and the wires either emit or are sensitive to electromagnetic interference.

Figure 2:
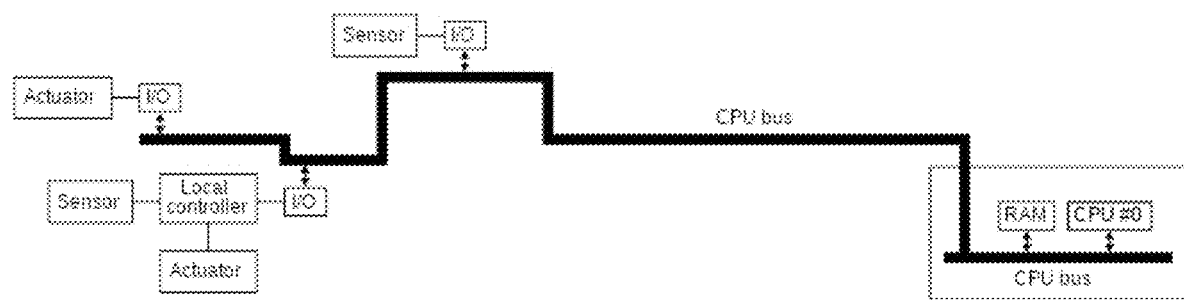
FIG. 2 represents a system in which a computer program is used to implement a control law between a set of sensors and actuators, wherein all I/O devices are moved as close as possible to their respective sensors or actuators.

An interesting alternative is to move all I/O devices as close as possible to their respective sensors or actuators, as shown in FIG. 2. The major inconvenience of this solution is the requirement to bring out the CPU bus into the automation system. Because of the sensitivity of this bus to interference, this is not a viable solution.

In the architecture in FIG. 2, the CPU fetches instructions from its random access memory (RAM). The instructions then cause the CPU to issue read or write requests on the CPU bus. They also let the CPU perform the necessary arithmetic operations for implementing the control law.

It is important to note that the read and write request are fulfilled nearly instantaneously since the CPU bus is very fast. In fact, the I/O devices are not allowed to stall any requests since the CPU would be stalled as well.

Figure 3:
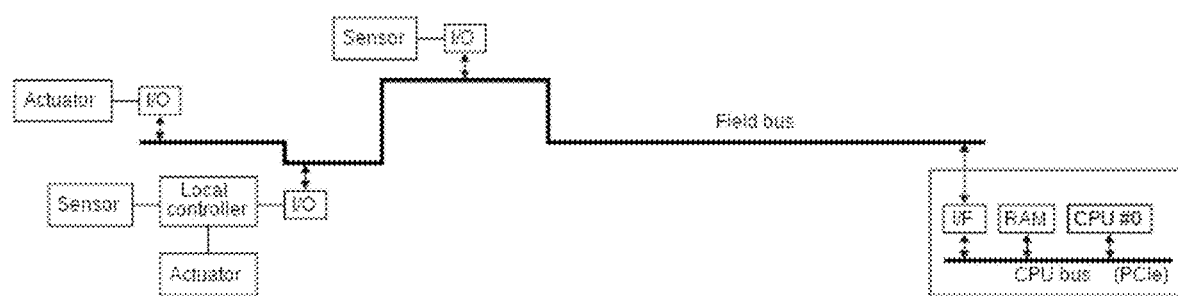
FIG. 3 represents a system in which a computer program is used to implement a control law between a set of sensors and actuators, wherein a field bus replaces the CPU bus.

For industrial control applications, field buses have been introduced to transfer the requests for sensor measurements and actuator settings over a network that is more robust. A field bus replacing the CPU bus is depicted in FIG. 3. The field bus is generally much slower than the CPU bus. Therefore, the main controller software must prepare packets containing the information requests for the sensor, the actuator and the local controller and program the field bus interface (I/F) with fast CPU bus transactions to transmit them.

Any information that is received back from the sensors and actuators is stored by the field bus interface until it is picked up by the CPU. This approach ensures that the CPU never waits for field bus transactions to complete.

Figure 4:
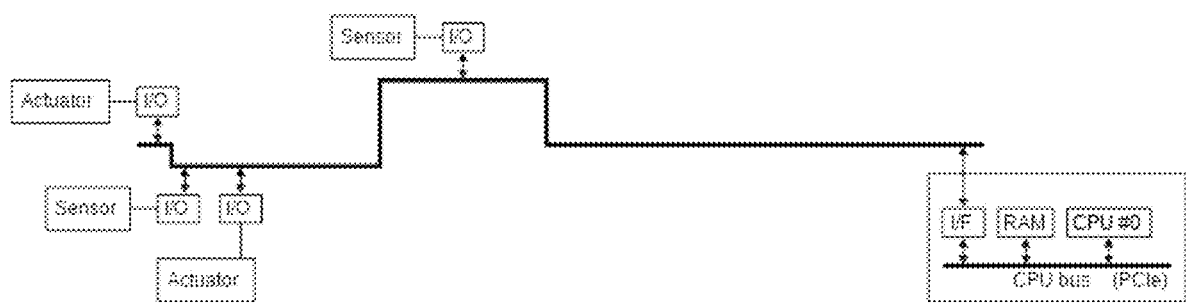
FIG. 4 shows a control system architecture with a central controller.

As the speed of the field buses increased, it became possible to run the control of the second sensor and actuator, which have been controlled by the local controller so far, also by the controller. FIG. 4 shows this control system architecture with a central controller.

Figure 5:
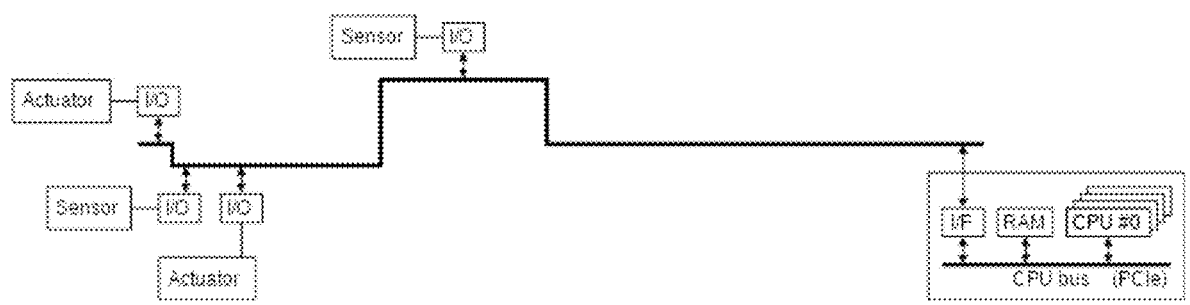
FIG. 5 shows a control system architecture in which multi-core CPUs have been introduced.

As the size of the systems and the complexity of the control laws grows, the CPU is increasingly loaded, leading to the introduction of multi-core CPUs as illustrated in FIG. 5.

This architecture is in widespread use today. While it is fast, reliable and powerful, some issues are starting to emerge as the size and complexity of systems continues to grow:

1. the network speed. Even though many networks already employ speeds in excess of 1 Mbit/s up to 100 Mbit/s, this is insufficient for many high performance control applications, in particular power electronic energy conversion;
2. the packet transfer scheduling. An increasing number of packets must be transferred, often at different rates. This problem becomes increasingly difficult to solve, especially when the transfer rates are unrelated;
3. usage of multiple cores. While multiple software processes are running in parallel on the CPUs, they must access the same I/F, causing CPU stalls.

Packet-Based Ring Control Network

Figure 6:
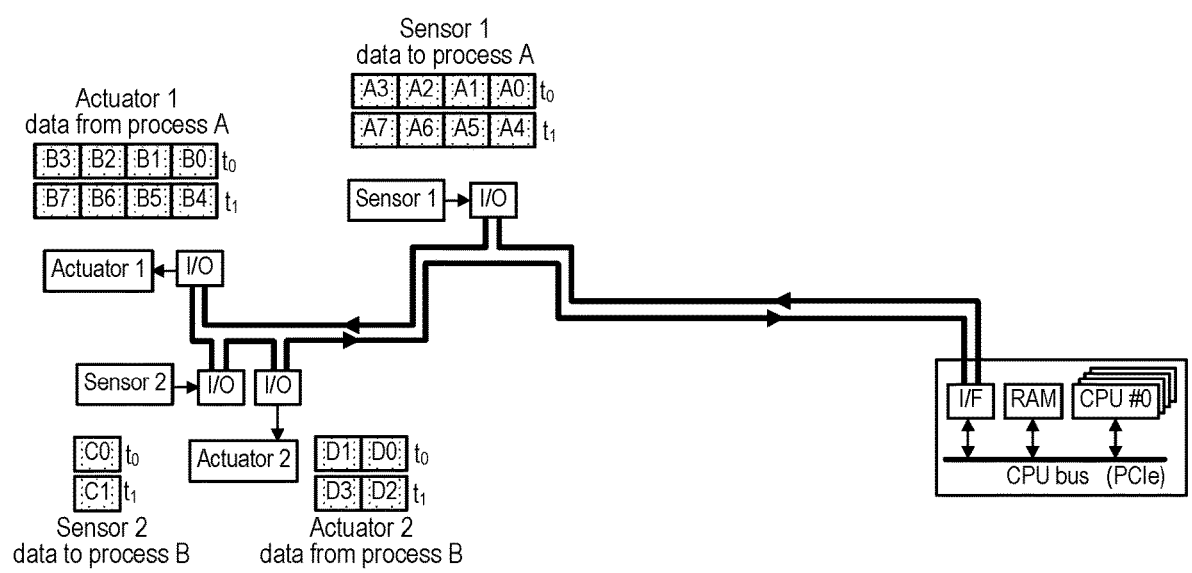
FIG. 6 shows a diagram of a ring control network implementation.

To facilitate the description of the present invention, which follows in the next sections, FIG. 6 shows a diagram of a packet-based ring control network implementation. The network is composed of 5 individual point-to-point directional network links. The I/F and each I/O block are connected in a ring, the output of each device feeding into the input of the next. The ring starts and ends at the processing unit.

Figure 7:
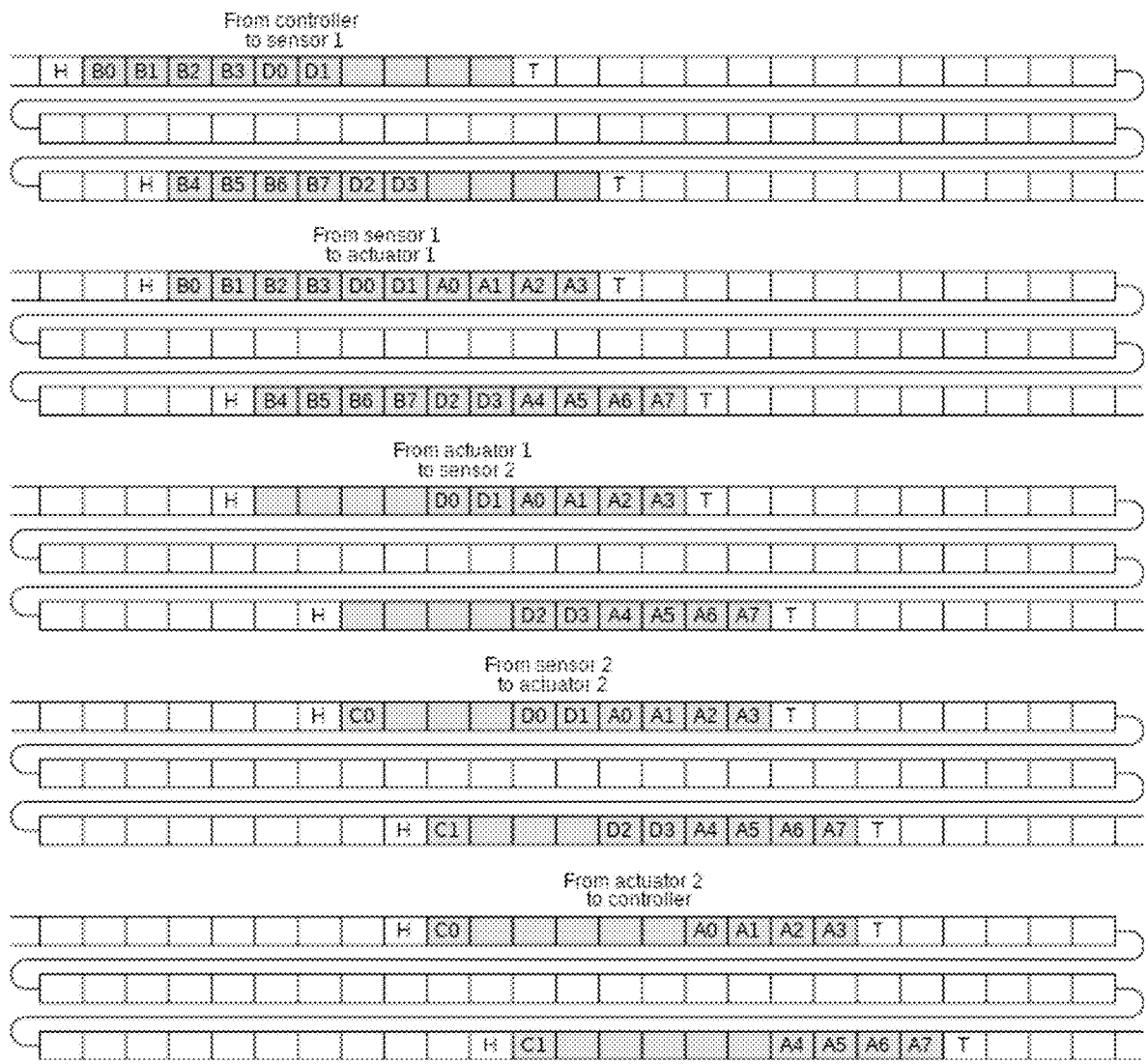
FIG. 7 shows the traffic on the individual segments of the ring network of FIG. 6 operating as a packet-based network.

FIG. 7 shows the traffic on the individual segments of the ring network. Packets are used with a head H and a tail T, but only one packet is sent and received by the processing unit at $t_0$, $t_1$, . . . .

Information is read and replaced as the packets traverse the I/O devices. When the packet leaves the controller, it contains fields B and D for the actuators, but since sensor 1 is the first in the chain, a free space must be allocated for data A from sensor 1. When the packet has passed the first actuator, the space allocated for field D is no longer needed, and it is subsequently filled with C data by sensor 2.

Note that the packet head H from actuator 2 is already being received by the processing unit before the transmission to sensor 1 has completed. Therefore, this architecture is very suitable for high-speed control networks.

Figure 8:
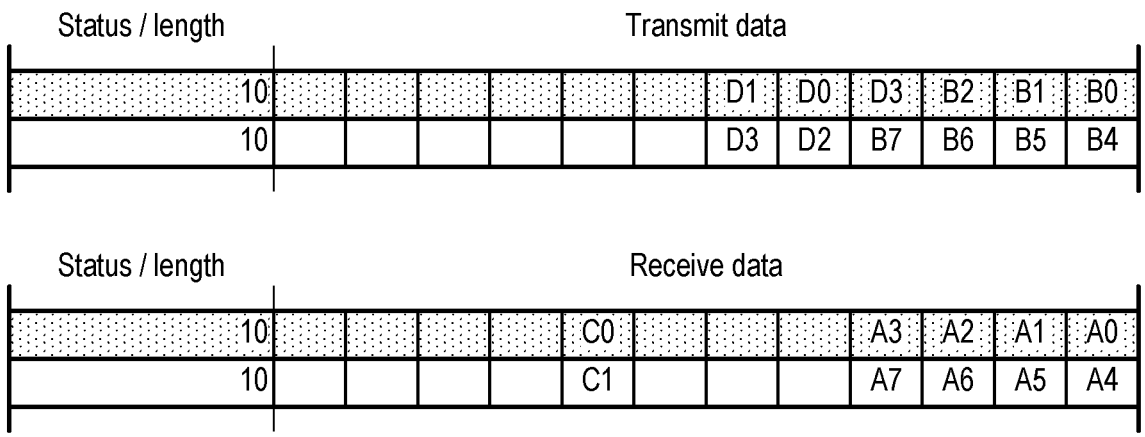
FIG. 8 shows a host buffer layout for use with the network of FIG. 6 operating as a packet-based network.

FIG. 8 shows the host buffer layout. As can be expected, only 2 packets must be transferred per cycle. Note the odd placement of C in the receive buffer, which is a consequence of the reuse of packet space. Still, the alignment is acceptable for the processing unit.

Figure 9:
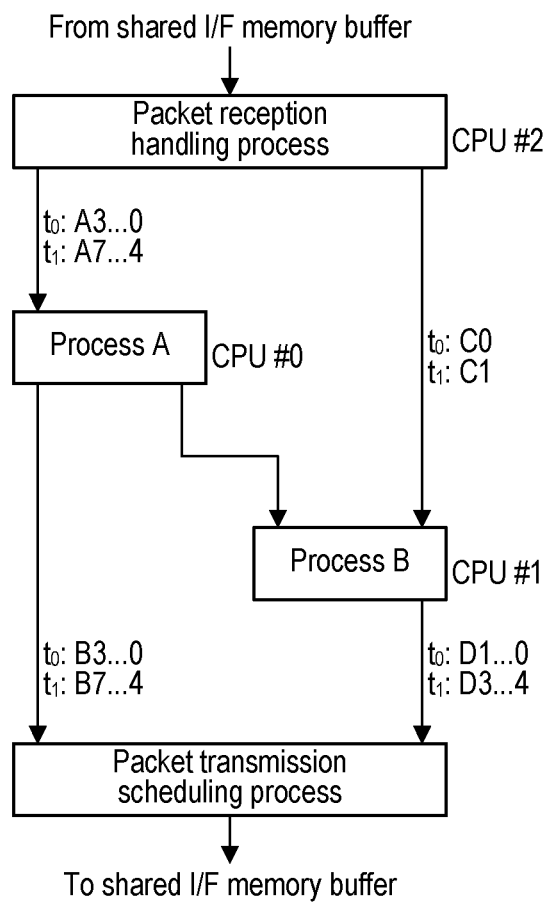
FIG. 9 shows a software program flow for the network of FIG. 6 operating as a packet-based network.

FIG. 9 shows the software program flow. Since there is only one packet received per process cycle, the packet reception handling process is actually null in this case. However, this is only the case because it was known beforehand the processes A and B would run synchronously, and the control network management software was therefore able to combine the traffic for all devices into one packet.

If another process would be introduced, the issue of receiving packets out-of-order would become prevalent again, requiring a packet transmission scheduling and reception handling process.

The software structure suffers from a bottleneck in its packet handling processes at increased packet rates, and needs to calculate scheduling instants at run-time if the process update rates would be unrelated.

XC System Ring Network

An embodiment of the system according to the present invention, hereinafter also referred to as the "XC system", will now be described in more detail with reference to FIG. 6 and the following Figures. The network is also composed of 5 individual point-to-point directional network links, hereinafter called "XC links".

The I/F and each I/O block are connected in a ring, the output of each device feeding into the input of the next. The ring starts and ends at the processing unit.

Figure 10:
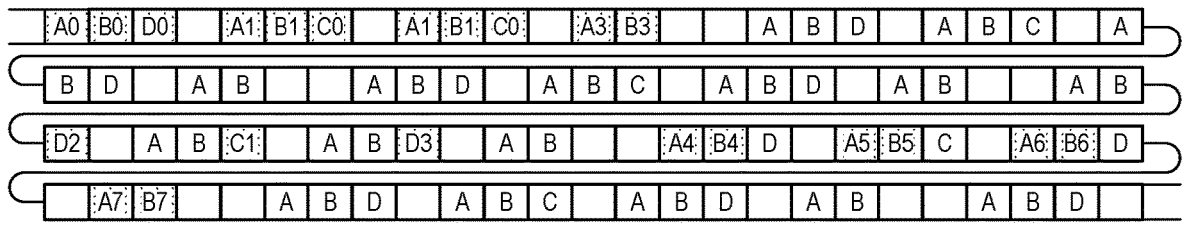
FIG. 10 shows the traffic on the individual segments of the ring network of FIG. 6 operating as an "XC system" network.

The difference is the way in which the information is exchanged with the processing unit. A quick glance to the network traffic in FIG. 10 reveals a radically different transmission method compared to the previous technology.

Rather than organizing the bits from the 4 A, B, C and D data fields in packets, they are transmitted in logical links (hereinafter referred to as "channels"), the bits of which occur at a constant rate.

As can be seen from the figure, the bits from channel A and B occur every 4 bits. The bits from channel D occur at half this rate, i.e. every 8 bits. The bits from channel C occur at ¼ of this rate, or every 16 bits.

Apart from the rate, which is always a negative power of 2 (1, ½, ¼, . . . ) the channels are also defined by a specific bit offset between each other, so that they do not interfere. The next chapter explains the theoretical background and discusses also a method to obtain valid channel configurations.

Each channel is allocated for transmission of a field. Even when nothing is to be transmitted in a channel, the channel is transferring bits (the channel bits without shading or bit numbers in FIG. 10).

Using this channel allocation approach, the remaining free space can be allocated and used by other processes without interfering with the existing channel configuration. Channels A to D will literally not be influenced one bit by additional usage of the free space.

There is also no head and tail anywhere in the XC system network traffic. Instead, each device is able to reconstruct the exact ordinal number (or "index") of each bit in a channel. An innovative step is that a set of channels is used for this recovery. As channels, by definition, do not interfere with one another, the exact periodicity of the channel bits remains unaffected.

This, in turn, means that the index of the bits in the ring network can be used directly as a time base. Instead of using a time stamp in packets to synchronize local clock at the packet rate, the XC system can synchronize local clocks at every bit, leading to improved accuracy and lower jitter.

Another advantage is that a digital, binary system can decode the network traffic directly with a very limited amount of hardware, making the XC system suitable for integration in FPGAs and ASICs.

The XC system continuously transfers small sections of the buffers between the host and the XC network interface. In principle, all bits that are ever sent or received by the processing unit originate or terminate in the host buffers.

While this approach seems to waste memory and bandwidth, one must consider that the data transfer is highly regular and fully handled by hardware. For current state-of-art hardware, the traffic is also not very significant. For example, with two 250 Mbit/s XC links, requiring a total transfer rate of 62.5 MB/s, this represents less than 0.5% of the 19.2 GB/s system bus of an Intel Xeon Broadwell architecture running at 2 GHz.

One must also consider that gigabit transmission technology has become remarkably cost-effective, and although its use throughout a control network is still too expensive, it can be used to feed a limited number of nodes capable of forwarding channels to ports using slower network technology.

Since the channel bits are strictly periodic, forwarding a channel from a fast link to a slow one is a matter of simply copying the bits, leading to simple implementations with low latency.

Figure 11:
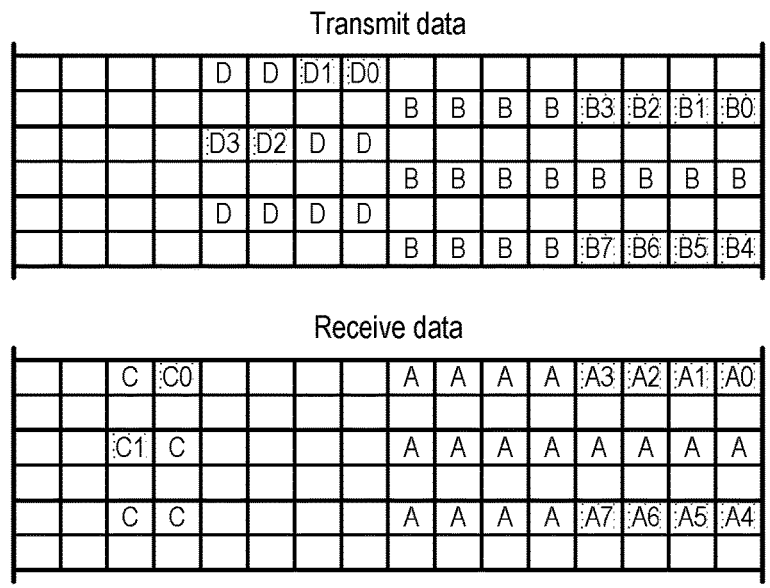
FIG. 11 shows a host buffer layout for use with the network of FIG. 6 operating as an "XC system" network.
Figure 12:
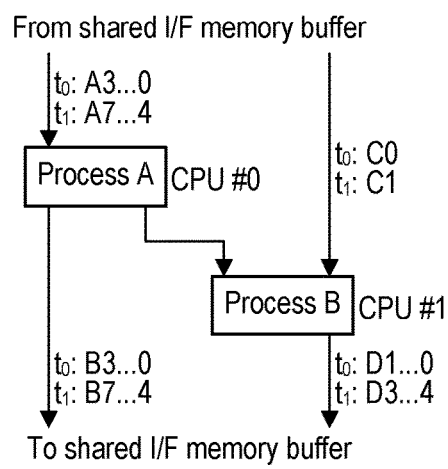
FIG. 12 shows a software program flow for the network of FIG. 6 operating as an "XC system" network.

Additional advantages of this approach become more clear when looking at the layout of the host buffers in FIG. 11 and the software program flow in FIG. 12.

The layout may seem odd, but it is the result of a bit address translation operation performed in hardware. This translation ensures that the channel bits are well aligned for access by processes.

There can be hundreds of thousands of buffers in a processor unit, which are continually reread (for transmission) and rewritten (for reception) by the XC network interface I/F. The location at which these bits are accessed, is directly related to the index that can be reconstructed by every I/O device.

Therefore, there is a strict relation between a process and its devices. The process must agree with the device where—and, hence, when—it expects the device to write bits back into the host buffer. The process simply needs to look for the data in the right place. In case of this example, process A may only write in the write data buffer bits designated B', since these bits will directly go to actuator 1. Likewise, it must look for sensor 1 data in the read data buffer bits designated 'A'. Although it possible to search exhaustively, a process must rather agree on a location.

In many systems where small messages are sent, the bulk of the host buffers is likely zero.

The result for the software flow is visible in FIG. 12. It is no longer necessary to schedule packet transmissions or handle packet reception. Process A and B read and write directly to the host buffers.

If a new process C would have to operate on data from sensor 1, but at a lower, unrelated rate, it can also directly access this data without interfering with process A.

Obviously, the amount of data exchanged with the host is orders of magnitude higher than with previous technologies. These technologies were developed with a totally different view on the use of a network. The network is used as a packet transport service, whereas the XC system regards it as continuously operating bit transfer device.

XC Link

The XC system is a digital data network, consisting of a number of XC links connecting a number of XC stations.

The fundamental component of an XC link is a traditional network channel capable of transferring a continuous, uninterrupted sequence of digital bits from a transmitter to a receiver. The rate at which bits are transferred, i.e. the bit rate, is constant and the bits are indistinguishable from one another.

Because the bits received cannot be distinguished from each other, i.e. one cannot tell the first one of a message in the continuous stream of incoming bits, a protocol is needed to indicate the start and end of a data transmission. One must also assume that the receiver may start listening to the transmitted bit stream at an entirely random position.

Current state-of-art network protocols use channel bit encoding to achieve this goal. A set of symbols is defined, part of which represents the data bytes to be transmitted. This then leaves 'unused' symbols that normally do not occur in data traffic, but can be used to indicate the start and end of a packet of data. Channel bit encoding is complicated since the symbol set must be defined so that the synchronizing sequence can never occur during data transmission. The XC system does not require such a symbol encoding, although it can run over (and take advantage of) a symbol encoded communications link.

Instead of using symbol encoding, the XC system assigns a "link bit index" to each bit that is transferred. The link bit index i is an integer number that increments by one for every bit transmitted. In theory, the index is unbounded, i.e. it starts at 0 and increases forever.

Using the link bit index i, the XC system implements parallel data channels each having an index "modulus" $M_k$ and a "remainder" $R_k$, with $R_k<M_k$. In mathematical terms, a bit belongs to a data channel k when:

$$i \bmod M_k = R_k$$

Additionally, each of the bits in a channel gets its own index, the "channel index", which is simply calculated as an integer division:

$$i \text{ div } M_k$$

Figure 13:
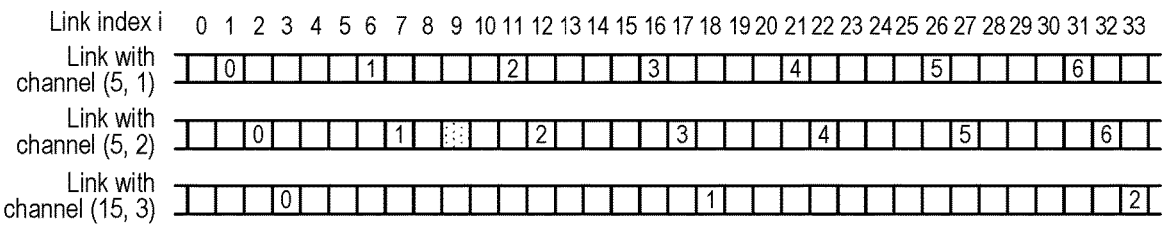
FIG. 13 schematically illustrates link indices I for (5, 1), (5, 2), (15, 3)

For example, when M=5 and R=1, the bits with link index 1, 6, 11, . . . all belong to a channel. For these link indices, the channel indices are 0, 1, 2, . . . as shown in FIG. 13.

The bit with link index 29,786 belongs to the channel as well, since 29,786 mod 5=1. It is also the bit with channel index 29,786 div 5=5,957, in other words, it is the 5,958th bit in the channel.

The bit with index 455,677 is not part of the channel, since 455,677 mod 5=2.

It is interesting to note that the channel with (M, R)=(5, 2) consists entirely of bits that are not in the (5, 1) channel.

Another interesting observation is that the channel with (M, R)=(15, 3) also consists entirely of bits not in either the (5, 1) or (5, 2) channel, but it contains only one third of the bits in those channels.

In this example, the use of an M value that is not a multiple of 5 results in overlap, i.e. bits will start to appear in two channels, which is not useful.

At the transmitting side, the index i can be easily kept track of. It is simply a counter that is incremented by one for every bit transmitted.

After the bits have been sent to the receiver, the index information i is lost, and the channels cannot be recovered immediately. The XC system provides a method to recover the link index i after transmission and reception.

For practical reasons, the recovery happens in 2 stages and involves the use of 2 parallel data channels, LS1 and LS2, making the recovery a recursive process. As an illustration, the example with M=5 will be continued.

Before the data is transmitted, the bit stream is multiplicatively scrambled. This essentially makes all bits become random, i.e. the probability of encountering a "0" or a "1" in any bit position in the XC link will be close 0.5.

For the channel (5, 0), however, the unscrambled content of this channel is adjusted so that a 1010 . . . sequence is obtained in the scrambled bit stream. Note that this must be done after all other bits have been defined, i.e. it must be the last step before transmission.

Figure 14:
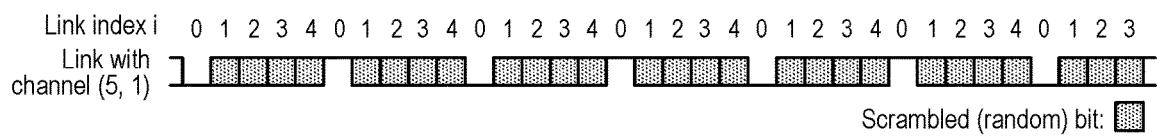
FIG. 14 provides an example of LS1 channel encoding with LS1=(5,0)

The first synchronization sequence, illustrated in FIG. 14, is designated as LS1 and its address, (5, 0) in this example, is an XC system parameter which depends on the link technology.

The receiver can find the (5, 0) channel by looking for the occurrence of the synchronizing sequence in the still scrambled received bit stream for e.g. 64 consecutive times. Since the other bits are all random, the probability of identifying the wrong channel is $2^{-64}$, which is sufficiently small.

When the (5, 0) LS1 channel is found, it is possible to retrieve any (5, x) channel, but the channel index of the bits is still unknown, because only i mod 5=1, so i can still be 1, 6, 11, . . . .

This is where the second synchronization channel LS2 comes in. In this example, it is the (5, 4) channel. After the (5, 0) channel is located, this channel can be found in the unscrambled data stream.

In the LS2 channel, i div 5 (or i itself) is encoded by the transmitter using a traditional channel bit encoding such as Manchester coding. Assuming that e.g. 32 bits are used to encode it, between 32×5×2+2=322 and 326 bits on the XC link are going to be needed (in case of a Manchester encoding) to transfer it. By choosing 32 bits to represent i, overflow will occur when i=$2^{32}$−1. A way of handling this overflow will be described below.

Figure 15:
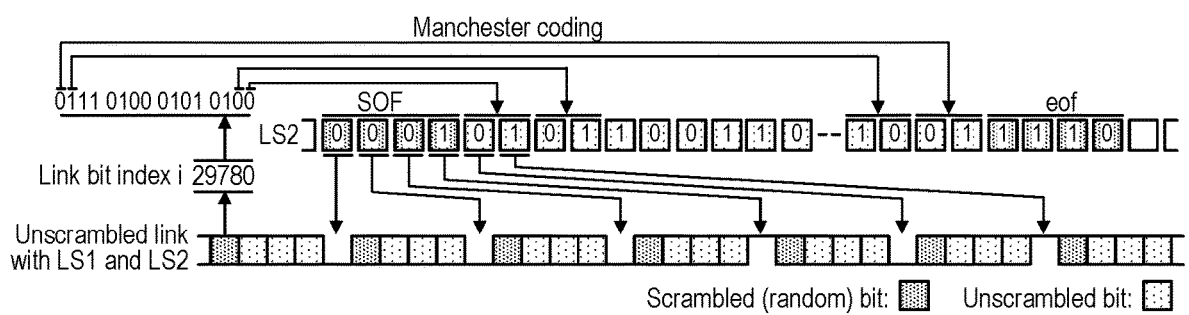
FIG. 15 provides an example of LS2 channel encoding with LS2=(5,4)

Note that in FIG. 15, the LS1 bits are marked as "scrambled". Though they technically are indeed scrambled, this is merely the result of the unscrambling operation on the unscrambled synchronization sequence that leads to a random sequence in the LS1 channel.

When i is eventually recovered at the receiver, the bits of the (5,1), (5,2) and (15, 3) channels can be recovered. The receiver continues to monitor the (5, 0) and (5, 4) channels to check the XC link integrity and validity of i.

When a link bit index is available, all channels on that link automatically have an index as well, i.e. it is possible to identify each bit in each channel.

This feature allows easy transmission of data consisting of groups (words) of bits, such as bytes, 16-bit, 32-bit and 64-bit words, by ensuring that the first bit of these words is always transferred when the channel index $j_k$ is divisible by the word width $w_k$, or:

$$j_k \bmod w_k = 0$$

Continuing the previous example, and assuming that data words of 16 bits are transferred over the (15, 3) channel, the link bit with link index 268,083 belongs to the (15, 3) channel, since 268,083 mod 15=3. In this channel, it has channel index 268,083 div 15=17,872. The bit is the first of a 16-bit word, since 17,872 mod 16=0.

In other words, as long as the link index i is available, the XC data channels do not require bit encoding in order to determine the boundaries of words.

This is a very important property, allowing the XC system to transfer hundreds, or even thousands of channels at the same time, with intrinsic alignment to the data word width and without bit encoding overhead.

XC Link Rate Control—LRC and LR1 Channels

A channel can also be used to indicate locations where a bit can optionally be inserted. By convention, the insertion point lies before the regular channel bits and the link index is not incremented for inserted bits.

Figure 16:
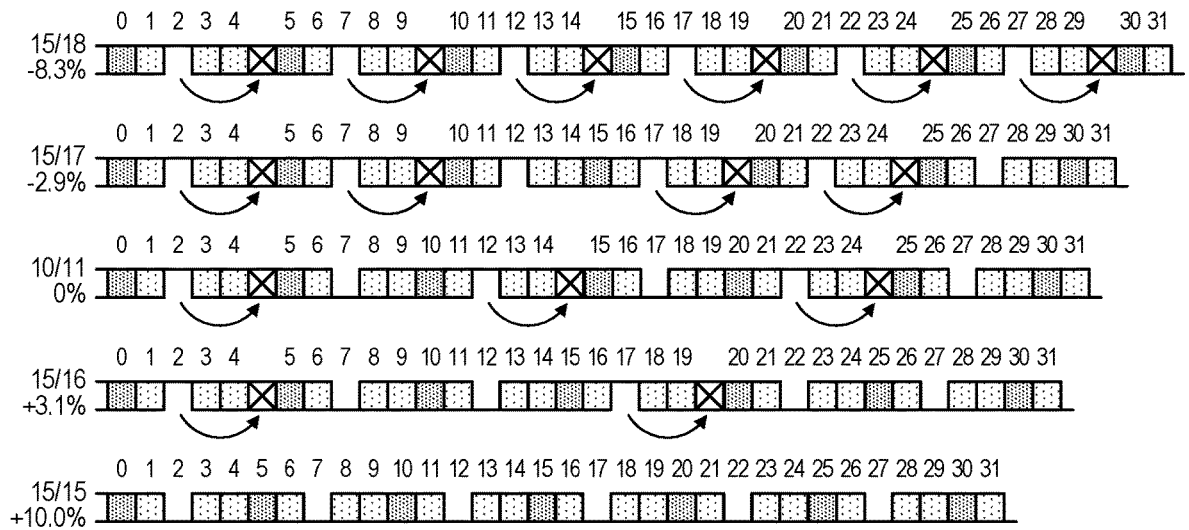
FIG. 16 illustrates the concept of link bit rate control, with exemplary values LS1=(5, 0), LRC=(5, 0), LR1=(5, 2)

The purpose of this optional bit insertion is to reduce the effective transmission rate of XC channel bits. For example, inserting an additional bit before every bit of a (5, 0) channel over a 100 Mbit/s XC link, as indicated by the first case in FIG. 16, effectively reduces the effective XC link bit rate to 83.33 Mbit/s. By controlling the insertion rate, the effective XC link bit rate can be varied from 83.33 Mbit/s to 100 Mbit/s, while the XC link itself continues to transmit at its native 100 Mbit/s bit rate.

A single channel is generally sufficient to achieve the goal of adjusting the effective XC channel bit rate. This channel is defined per XC link and is called the Link Rate Control (LRC) channel.

The optional insertion of bits would obviously interfere with the link bit index counter, which normally increments for every bit received. Therefore, pending bit insertions are indicated using a regular channel and, if asserted, the link bit index counter is not incremented for the bit received after the LRC channel bit. The channel used for the LRC insertion indication is designated as LR1. Optional LR2 and LR3 channels carrying redundant data are defined to harden the LRC insertion indication against single-bit errors, which would otherwise cause the link synchronization to fail. However, a single bit error on the scrambled XC link bit stream causes multiple bit errors at known locations in the unscrambled bit stream and therefore, different locations must be selected for allocation of these additional LR2 and LR3 channels.

In many cases, the speed range supported by link rate control can be limited, ensuring a minimum, nonzero bit rate of the LRC channel bits. In the above example, the effective bit rate is 90.90 Mbit/s (½ inserted), and limiting the range to 88.23 Mbit/s (⅔ inserted) and 93.75 Mbit/s (⅓ inserted) ensures a minimum bit rate of 6.7 Mbit/s on the LRC channel.

The LRC channel content is irrelevant for the link rate control function. It is in fact available for data transfer, but the bit rate is unknown. Also, since the LRC channel bits have no link index, they are not accessible by processes and devices, and cannot be routed by link rate transition blocks.

One reason for varying the link speed is to allow daisy chaining of two XC links. In that configuration, a network station receives data bits over an XC link on one port (the input port), and, using the 2-stage technique described above, recovers the link bit index, allowing the XC data channels to be accessed on the network station. Lastly, the data bits are transmitted again over an XC link on a second port (the output port).

There is only a limited amount of time each bit needs to traverse the station from the input to the output port. Daisy chaining is a versatile network topology, allowing the construction of ring networks.

For daisy chaining, the XC input and output link bit rates must be exactly equal. However, in practice, the bit rates of XC links originating from two stations are never equal.

Therefore, the effective bit rate is reduced somewhat using an LRC channel. For example, if the LRC is channel (5, 4) and every other LRC bit is actually inserted, i.e. the insertion rate is 50%, an XC link with a nominal bit rate of 100 Mbit/s will have effective XC data bit rate of 90.90 Mbit/s (10 effective data bits for every 11 bits transferred at 100 Mbit/s).

Continuing this example, if the input XC link data rate were exactly 100 Mbit/s, but the output XC link data rate was slightly higher, i.e. 100.1 Mbit/s, this difference can be accommodated by somewhat increasing the insertion rate on the LRC channel in the output XC link. To be precise, 5,055 insertions have to be done per 10,000 LRC bits. (For comparison, the originating station used 5,000 insertions per 10,000 LRC bits.)

A practical method is to construct a buffer of valid (non-inserted) XC data stream bits and use its level to adjust the insertion rate of the LRC channel. If the buffer level is low, the insertion rate is increased to reduce the effective output data bit rate below the input data rate, causing the buffer to fill up again. Conversely, the LRC insertion rate is decreased when the buffer level is high.

An extremely important property of the XC data channel bits, using this implementation of link rate control, is that the channel bits always remain periodic to within $1/M_C$ or $1/M_{LRC}$ of the channel bit period, whichever is less.

Consider for example that the LRC is (6, 0), i.e. a rate control bit is optionally inserted before every group of 6 bits. A channel with $M_C$=6 such as (6, 1) will suffer less than one extra XC link bit of delay whenever the LRC insertion occurs, which is no more than one-sixth ($1/M_{LRC}$=$1/M_C$) of its own period.

A channel with $M_C$=3 such as (3, 2) will suffer either 0 bits, or alternatingly 0 and 1 bit of delay, corresponding to at most one-third ($1/M_C$) of its own bit period.

A channel with $M_C$=12 such as (12, 1) can suffer either 0, 1 or 2 delay bits, but this also corresponds to no more than one-sixth ($1/M_{LRC}$) of its channel bit rate.

The worst case actually happens when $M_C$=1, but this configuration, having an unnecessarily high rate adjustment range, is never used in practice.

XC System Time

Another reason for effective link bit rate control is that, simply using the link bit index directly, a common time base can be established across an entire XC system.

The XC system uses the known reception (bit recovery) and buffer delays to offset each station's link bit index to obtain a time base against which events can be scheduled.

The LS1 and LS2 channels in the XC system are intended to be used by a PLL for providing an accurate time base. Since the LS1 update rate is typically in the microsecond range, the tracking performance is much better than packet based network synchronization solutions.

Many state-of-art systems use an exchange of packets (IEEE-1588) or a timestamp on each packet to determine the bit delay between stations during operation.

XC Stream

Figure 17:
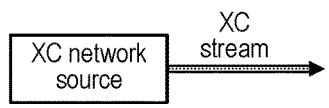
FIG. 17 illustrates an XC stream from the network source.

An XC stream is a collection of signals that is internal to a device and carries the XC link bits, along with the XC link bit index and some additional control signals for rate control. XC streams originate from in internal network source (FIG. 17) or an XC link receiver (FIG. 18).

XC streams can be terminated by an XC link transmitter (FIG. 19), or simply left unconnected.

Figure 18:
FIG. 18 illustrates an XC stream from the network link receiver.
Figure 19:
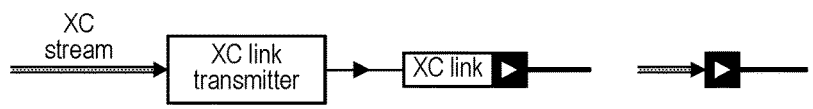
FIG. 19 illustrates an XC stream to the network link transmitter.
Figure 20:
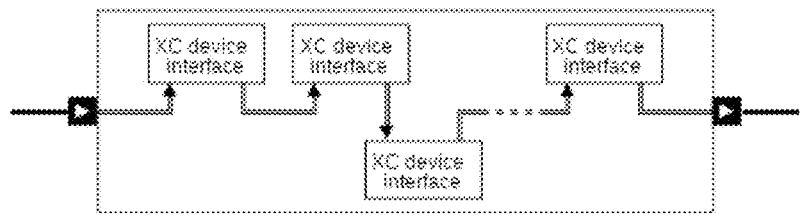
FIG. 20 illustrates an XC network device with internal XC devices daisy-chained using internal XC streams.

FIGS. 18 and 19 also show, at the right side, a more compact representation of the XC link receiver and transmitter. Finally, FIG. 20 shows the use of an XC stream inside a device connected to the XC network, i.e. a network node.

Figure 21:
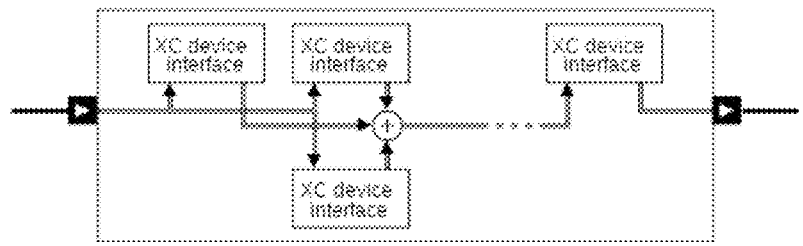
FIG. 21 illustrates an XC network device with combined parallel and daisy-chained internal devices.

XC devices do not always have to be daisy-chained. When an incoming channel is known to contain no data, i.e. all channels bits are deasserted, the XC streams can be connected in parallel, using a logical OR gate to create the output stream. Obviously, devices operating in parallel can also not receive data from each other. The principle is illustrated in FIG. 21, and it may be used to reduce the critical path delay in a device implementation.

XC Link Rate Transitions

Since XC channel data bits are strictly periodic, they can be used immediately to exchange data with another, secondary XC link at an integer fraction or multiple of the primary link bit rate with minimal delay and hardware.

In general, when associating a primary link channel ($M_P$, $R_P$) to a secondary link, the bit rate of the secondary link, by definition, is $1/M_P$ of the primary link. Any channel ($M_S$, $R_S$) defined in the secondary link then corresponds to the following channel in the primary channel:

$$(M_S, R_S) \leftarrow (M_P M_S, M_P R_S + R_P)$$

Figure 22:
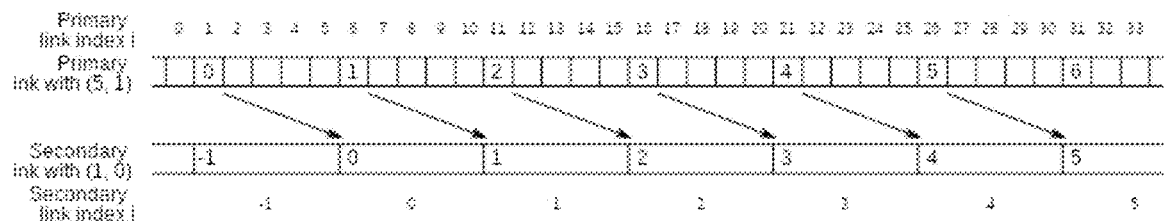
FIG. 22 schematically illustrates the high-to-low rate transition of channel (5, 1) to (1, 0)

For example, it is possible to use the (5, 1) channel bits of a primary channel to exchange data with a secondary link having a bit rate of ⅕th of the primary link bit rate (see FIG. 22).

Figure 23:
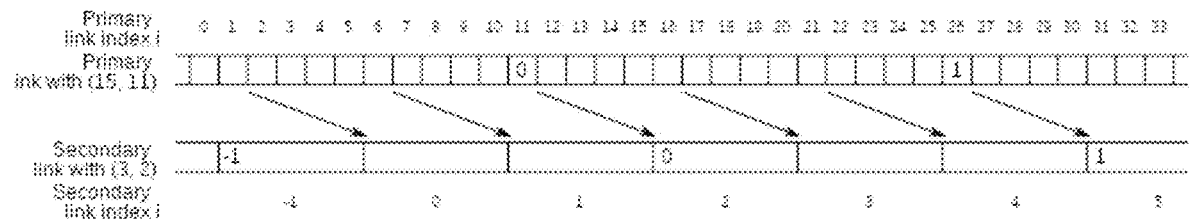
FIG. 23 schematically illustrates the high-to-low rate transition of channel (15, 11) to (3, 2) using composite channel (5, 1)

In that case, the (3, 2) channel in the secondary link corresponds to the (15, 11) channel in the primary link as shown FIG. 23. Less obviously, the (9, 3) channel becomes the (45, 16) channel in the primary link.

In this case, the (5, 1) channel is said to be a "composite channel", since it carries the symbols of more than one logical channel.

The ability to route multiple separate channels from one link to another by specifying only a single channel is very useful and effective in keeping hardware complexity and resource requirements low in network routers, which are network nodes connecting fast and slow links.

It is also possible to connect a faster secondary link to a slower primary one. In this case, the same formula as mentioned above applies, with the primary and secondary moduli M and remainders R interchanged.

The correspondence works in both directions, i.e. a bit can be transferred from the primary to the secondary link and the other way around at the same time.

Figure 24:
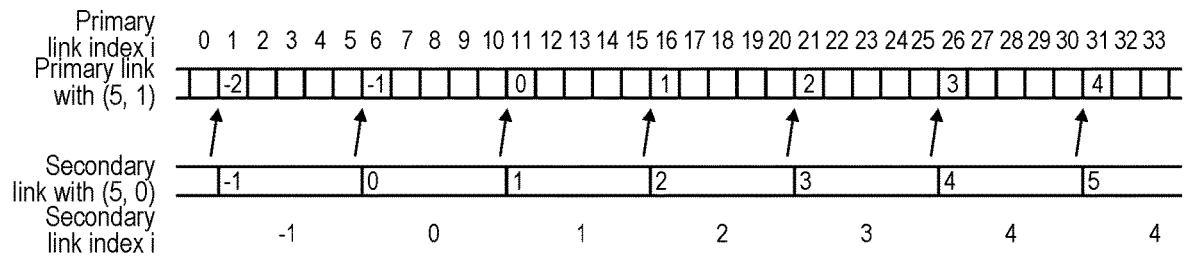
FIG. 24 schematically illustrates the low-to-high rate transition of channel (1, 0) to (5, 1)

However, there is an important issue when the same bit index is used in the secondary link for both directions, as in this case, the transferred composite channel bits are delayed as shown in FIG. 24.

It is clear that the secondary channel (1, 0) bit index 0 cannot be written into the primary channel (5, 1) index 0, when the same secondary index must be used for reading as well. Instead, a delay of 2 secondary link bits is incurred.

This delay can normally be compensated efficiently for when the channel is memory mapped, a process that is discussed in section "XC link memory mapping" below.

Routers can be made capable of routing any channel from the primary link to any other channel on the secondary one using a routing table. A routing table can be used to e.g. map the primary link channels (10, 2) and (10, 8) to the secondary link channels (2, 0) and (2, 1) respectively, which is something that cannot be done using a composite channel. In this case, the routing table simply contains the values 2 and 8 for secondary link index remainders 0 and 1.

Figure 25:
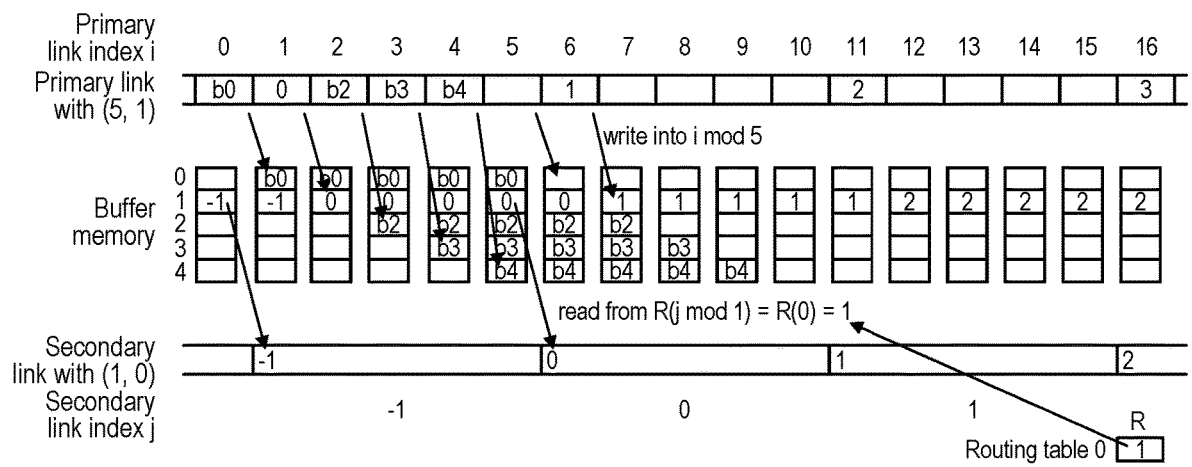
FIG. 25 schematically illustrates the high-to-low rate transition of channel (1, 0) to (5, 1) using routing table R.

In general, the routing table contains $M_S$ entries referring to a buffer containing $M_P M_S$ entries, with $M_S$ being the highest modulus ever needed in the secondary link. Primary link bits with link index i are continuously stored at buffer location i mod $M_P M_S$, effectively creating a circular buffer (see FIG. 25).

For example, the direct transfer of a primary link (composite) channel (5, 1) to a secondary link channel (1, 0) can be achieved using a single-entry routing table with the entry 1 referring to the second element of a buffer containing the primary link bits stored in locations i mod 5. The buffer is fully rewritten every 5 primary link bits, of which the second one (bit 1) is always chosen.

The composite channels described above are helpful to keep the size of the buffer and routing table sufficiently small for efficient implementation. Especially in transitions between gigabit rates, when a large number of channels is routed, the number of buffer entries could otherwise become prohibitively large.

Finally note that, although the routing buffer is the largest, it only contains a single bit per address and, therefore, the memory array size remains limited.

XC Link Memory Mapping

When a number of channels must be accessed by a single device, the direct decoding of the individual XC channels is both impractical and inefficient. Additionally, in most cases, multiple channel access is actually not required by peripherals, but rather by control software processes that are executed on the same control unit.

A control unit generally consists of one or more microprocessors having fast access, usually through multiple caches, to a common random access memory. The microprocessors each may consist of one or multiple cores. Many microprocessor architectures have a per-core timer for the accurate generation of a core-local timer interrupt, i.e. a timer interrupt that does not affect the other cores. The interrupt invokes a part of the operating system which, apart from reprogramming the timer for the next task, transfers the execution flow of the core to the software control process, essentially scheduling the process at a predetermined time instant.

When a control software process running on a core requires access to peripheral input or output data, there is always a variable but limited latency between the access request and the data access itself.

Taking advantage of the fast access path from the microprocessor cores to the main memory, the XC system defines the direct mapping of an entire XC stream to a processing unit's shared memory area, both for reception and transmission. In both cases, the latency caused by this mapping is not fundamentally different from the access latency each peripheral access would have incurred anyway as described above.

Since the link can have gigabit rates that may surpass the transfer capability of a processing unit's peripheral bus, the preferred method is to use a single composite channel for mapping a limited amount of data to the shared memory area. The remaining link capacity can either be used for fast inter-device XC channels, or be processed by another processing unit running another, additional set of software control processes.

Figure 26:
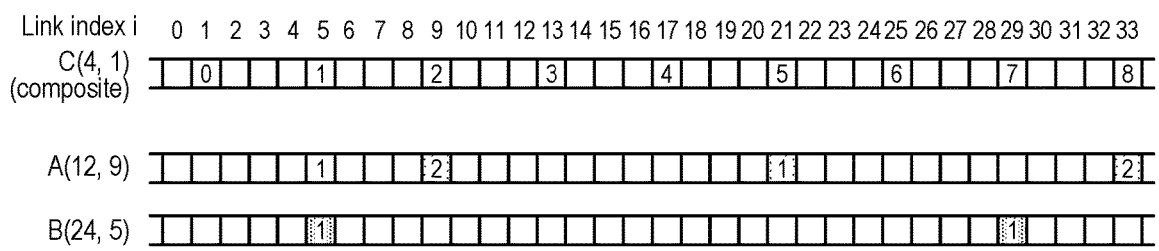
FIG. 26 illustrates an exemplary XC link for mapping with composite channel (4, 1)

To illustrate the operation of the XC link memory mapping, an example will be used. FIG. 26 shows a (4, 1) composite channel which will be memory mapped. The composite channel contains two channels A (12, 9) and B (24, 5). Referred to the composite channel (4, 1), channels A and B can be represented as (3, 2) and (6,1) respectively.

At an XC link speed of 250 Mbit/s, the transfer rate of the entire XC link would be 31.25 MB/s in both read and write directions. Limiting the mapping to the composite channel (4, 1) reduces this rate to a less demanding 7.81 MB/s. The ability to map composite channels is essential for interfacing the XC system to less powerful control units using embedded processors. It also allows peripherals using cost-efficient embedded processors to access a number of XC channels in parallel.

Most control unit architectures do not support individual bit accesses to and from the main memory area. Instead, data is transferred most efficiently using word widths of $2^N$ bits, with existing systems using word widths ranging from 8 up to 1,024 bits.

Figures 27, 28, 29, 30:
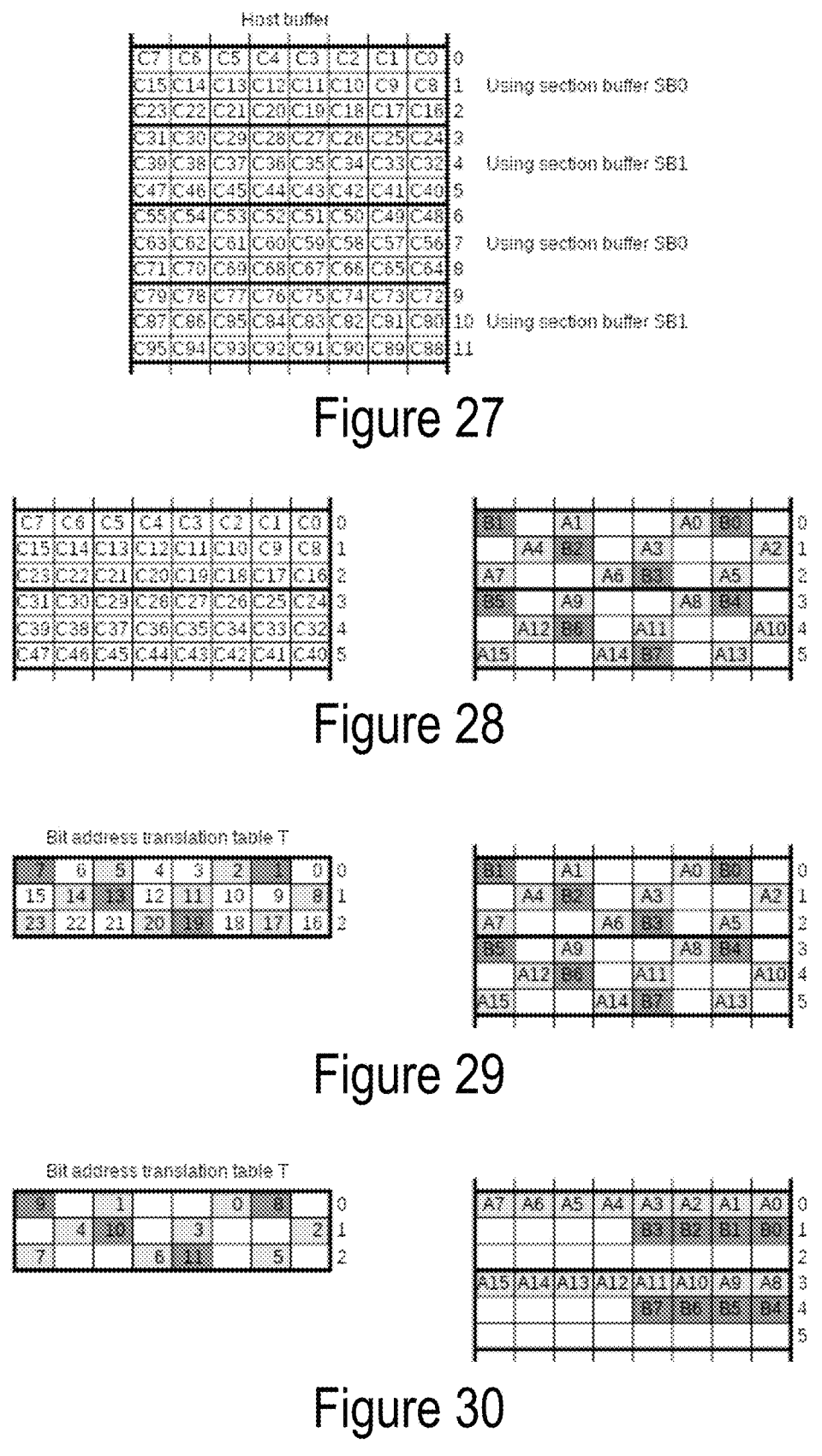

Therefore, in order to improve the transfer efficiency, the XC channel memory mapping uses at least two intermediate bit-addressable section memory buffers to exchange XC channel data continuously with either one or two host memory buffers allocated in the processing unit ("host") main memory area. A first section buffer SB0 is accessed per bit as the XC composite channel data bits are received or transmitted. When SB0 is done, the buffer contents are efficiently exchanged per word with the host memory buffers in only a limited number of peripheral bus transfer cycles. The operation is illustrated in FIG. 27 using two 24-bit buffers SB0 and SB1 operating on a single host buffer.

While the data exchange with the processing unit is in progress, a second bit-addressable section buffer SB1 is used to exchange the XC composite channel data without interruption. When SB1 is done, the data exchange with the host buffer is repeated, and SB0 is used again for XC composite channel data exchange, assuming that the host buffer data exchange is complete by then.

The host buffer is configured to accommodate a sizable amount of section buffers. When the last section buffer data exchange is complete, the data exchange process is restarted from the first section buffer entry in the host buffer, effectively creating an infinite, circular buffer. Since the cost of main memory is very low, a host buffer can be made very large, covering e.g. several seconds of XC channel data.

Note that a data exchange implies, in case of XC channel data reception or transmission, respectively the transfer of the section buffer data to the corresponding host buffer area, or the transfer of the data from the corresponding host buffer area to the section buffer.

The example in FIG. 27 also showed that the (4, 1) composite channel data are well aligned for access by an 8-bit data processing architecture. However, that is not necessarily the case for the child channel data contained within the composite channel. FIG. 28 shows the data of the composite channel C alongside the A and B channel data, indicating poor alignment of these channels in the host buffer.

In general, since the processing units usually process data as words, the direct mapping of a composite channel containing the interleaved data of multiple channels is highly inefficient. In worst case, a core must read a full memory word for every XC channel bit received.

In the example, the processing unit must read all host buffer bytes from hb(0) to hb(5) to obtain B[7 . . . 0]. It must also perform the following complex reconstruction operation:

$$b=((hb(0)>>1)\& \ 0x1)|((hb(0)>>6)\& \ 0x2)|((hb(1)>>3)\& \ 0x4)|(hb(2)\&0x8)|((((hb(3)>>1)\& \ 0x1)|((hb(3)>>6)\& \ 0x2)|((hb(4)>>3)\& \ 0x4)|(hb(5)\& \ 0x8))<<4);$$

Even worse, for every XC channel bit transmitted, not only a full word must be written, but in this case the word may contain bits that have previously been written, or are in the process of being written to, by other processes as well. Before a word write, the core's cache management system must possibly reload the modified word from another core's cache. The word modification must also be atomic, slowing down the update even further.

In order to improve the spatial distribution of the child channel data bits, a bit address translation table, similar to the routing table discussed above in the section "XC link rate transitions", is used. The table T contains as many entries $N_S$ as a single section buffer, and redirects every bit in the XC composite channel stream based on its channel index c to a location s in the active section buffer according to:

$$s=T(c \bmod N_S)$$

FIG. 29 shows the section (and host) buffer content when the bit address translation table T contains a straight mapping from the C channel bit index c to the section buffer bit address. As can be expected, the result is identical to the host buffer layout in FIG. 28.

Loading the bit address translation table T with different entries leads to a much better alignment of the A and B channel data bits, as shown in FIG. 30.

Unused bits in the channel are marked without an entry in the translation table. In practice, an unused bit address could be used (since the table is a permutation), but this was not done in this example for reasons of clarity. Using the channel index c mod 24 as an index into the translation table, the offset into the current section buffer is found at which the channel bit is read from or written to.

For example, the C channel bit with index 1 (bit 0 from channel B) is written to section buffer SB0. In another example, the C channel bit with index 51,293 is bit 17,097 of channel A (A17097) which maps to section location T(51,290 mod 24)=T(5)=1.

It is apparent from FIG. 30 that, compared to the previous case, B[7 . . . 0] can be derived with significantly less memory accesses and effort:

$$b=(hb(1)\& \ 0xF)|((hb(4)\& \ 0xF)<<4);$$

The additional effort to recover full data words is reduced as the section buffer size grows. As can be seen, there is no data processing required to access the channel A[7 . . . 0] words since:

$$a=hb(0);$$

The allocation of the redirected bits in the section buffer, i.e. the contents of T, represents an allocation problem, which is not always straightforward to solve in the general case with variable M. However, a systematic, efficient way for the determination of T exists for $M=2^N$, as will be explained later in the section "XC channel memory mapping with $M=2^N$".

XC System Implementation with $M=2^N$

Limiting the modulus M of a channel to integer powers of 2 leads to both implementation advantages and additional features in the XC system. In the following sections, the implementation advantages are discussed.

Using $M=2^N$, it is possible to unambiguously specify an XC channel with only one integer number instead of an (M, R) tuple. This number is the XC address A and it is simply given by:

$$A=M+R$$

In previous examples, the modulus has always been a multiple of an integer number (5), and this leads to the use of channels (5N, R)=(5,0), (5, 1), (15,3), . . . . In this case, the address 28 could represent the channels (25, 3), (20, 8) or (15, 13).

This ambiguity does not occur when the modulus is a power of 2. Continuing the previous example, address 28 uniquely refers to (M, R)=(24, 12)=(16, 12).

In fact, it is sufficient that M be a power of any integer base, but a base of 2 enables a very straightforward implementation on systems using a binary number representation. With $M=2^N$, N is defined as the order of the channel (M, R). Additionally in this context, the function N(c) is defined as floor($\log_2(c)$) and returns the order N of an arbitrary XC channel address c.

Finding M from an arbitrary XC address can be done by finding the first power of 2 that is larger than the address, and dividing this number by 2. In the above example, 32 is the first power of 2 larger than 28 and division by 2 results in M=16. R can be found as R=A−M=12.

In a binary representation of the address, the process is even simpler: find the leftmost nonzero bit and zero out all others. Since 28 has a binary representation of 11100b, M is given by 10000b, which is 16.

The least complex way of finding R is to take all bits to the right of the leftmost nonzero bit. Thus, R=01100b, which is 12.

The XC channel with address 1 corresponds to all bits in the XC link, i.e. channel (1, 0).

An XC address value of 0 is used to indicate a disabled channel. The order N(0) of XC address 0 is undefined.

TABLE 1

Channel addresses and channel bits

| XC channel address | | | | Bit rate | |
|---|---|---|---|---|---|
| Hex | Binary | N | R | $(1/2^N)$ | Channel bits |
| 00h | 00000000b | — | — | — | (channel disabled) |
| 01h | 00000001b | 0 | 0 | 1 | b0 b1 b2 b3 ... |
| 02h | 00000010b | 1 | 0 | 1/2 | b0 b2 b4 b6 ... |
| 03h | 00000011b |   | 1 |   | b1 b3 b5 b7 ... |
| 04h | 00000100b | 2 | 0 | 1/4 | b0 b4 b8 b12 ... |
| 05h | 00000101b |   | 1 |   | b1 b5 b9 b13 ... |
| 06h | 00000110b |   | 2 |   | b2 b6 b10 b14 ... |
| 07h | 00000111b |   | 3 |   | b3 b7 b11 b15 ... |
| ... | ... | 3 | ... | 1/8 | ... |
| 0Ah | 00001010b |   | 2 |   | b2 b10 b18 b26 ... |
| ... | ... |   | ... |   | ... |
| ... | ... | 4 | ... | 1/16 | ... |
| 12h | 00010010b |   | 2 |   | b2 b18 b34 b50 ... |
| 13h | 00010011b |   | 3 |   | b3 b19 b35 b51 ... |
| ... | ... |   | ... |   | ... |
| 1Ah | 00011010b |   | 10 |   | b10 b26 b42 b58 ... |
| ... | ... |   | ... |   | ... |
| ... | ... | ... | ... | ... | ... |
| ... | ... | 7 | ... | 1/128 | ... |
| C9h | 11001001b |   | 9 |   | b9 b137 b265 b393 ... |
| ... | ... |   | ... |   | ... |

Figure 31:
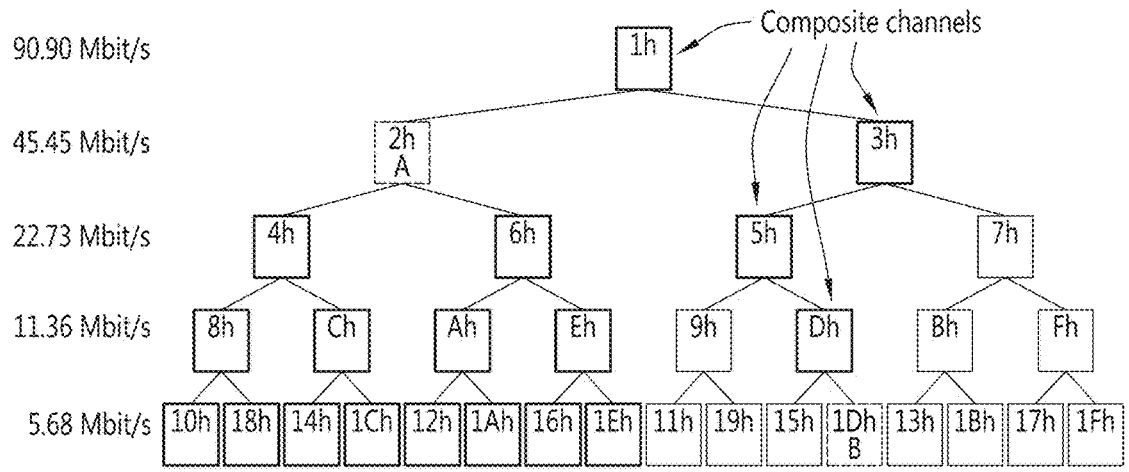
FIG. 31 illustrates the allocation of exemplary channels 2 (2h) and 29 (1Dh)

Initially, all channels are available for use. However, as soon as a channel is assigned, all parents as well as all children of the assigned channel become unavailable. The parent channels become composite channels carrying the traffic of at least one channel with a lower rate. This is illustrated in FIG. 31.

In this example, channels A (2=2h) and B (29=1Dh) have been allocated, causing several other channels to become unavailable (grayed out). It follows directly from this definition that a set of collision-free channels is always obtained, since after assignment of an available channel, its parent and 2 children channels are the only ones colliding with it, and both the parent and children channels are marked as unavailable recursively. When assigning XC channels to fulfill a channel bandwidth request, those channels must be selected from the available ones that cause the least number of parent channels to become unavailable.

The allocation of bandwidth to channels can be done in any order, and the allocation of channel bandwidth is independent on previously made allocations. This does not mean that the allocation result is always the same. In worst case, two channels with the same bit rate are swapped, leading to a relative shift of the two channel streams by no more than one bit. It follows from this definition that the order in which the channel bandwidth requirements are applied, is unimportant.

Figure 32:
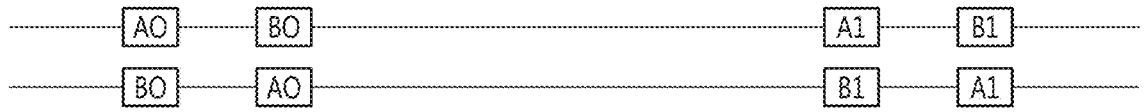
FIG. 32 shows the effect of the channel assignment order.

For example, two channels A and B have the same bit rate and are assigned to channels 14h and 17h. Then, the assignment is reversed, with A and B being assigned to 17h and 14h respectively. FIG. 32 shows the resulting link bit streams in both cases, clearly illustrating a shift of no more than one bit.

Figure 33:
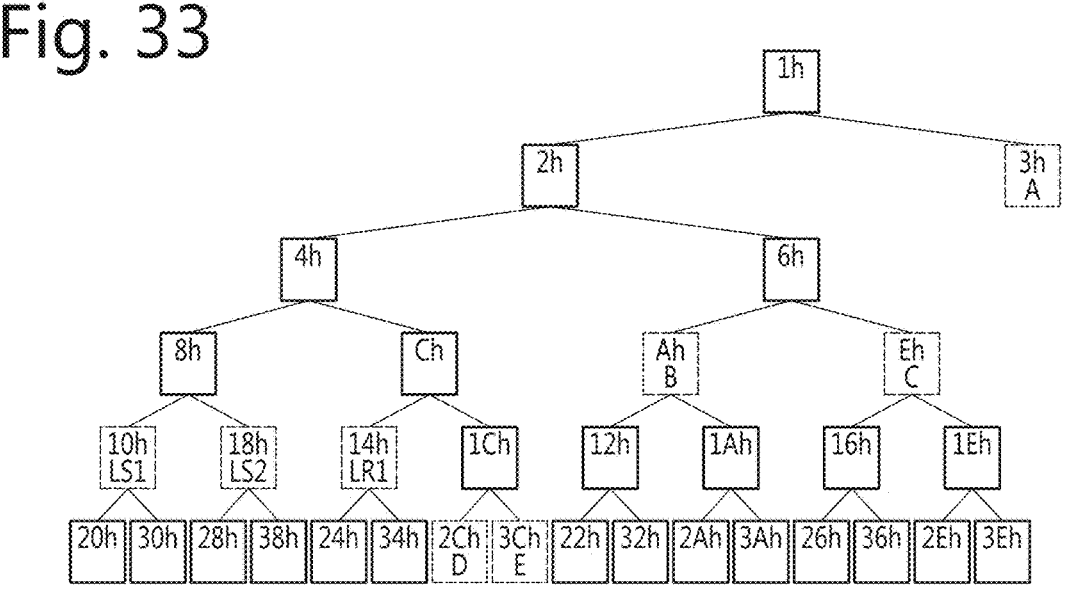
FIG. 33 presents an exemplary channel configuration.

The XC channel assignment is illustrated with the following example (see FIG. 33). It is assumed that an XC link has an effective bit rate of 90.90 Mbit/s. The bandwidth requirements for the system are: 1×30 Mbit/s (ch. A), 2×8.192 Mbit/s (chs. B, C) and 2×2.5 Mbit/s (chs. D, E).

The link also needs LS1, LS2 and LR1 channels, each requiring 1/16 of the link bandwidth.

To accommodate LS1, LS2 and LR1, XC channel 1 is split repeatedly as described, into channel 3 (45.45 Mbit/s), channel 6 (22.73 Mbit/s), and channels 16, 24, 20 and 28 (each 5.68 Mbit/s). LS1, LS2 and LR1 are assigned to 16, 24 and 20 respectively. Channels 3, 6 and 28 remain available.

The 30 Mbit/s channel A is assigned to address 3, because channel 6 has insufficient bandwidth. This leaves channels 6 and 28 available.

Channel 6 is split into channels 10 and 14 (each 11.36 Mbit/s). The two 8.192 Mbit/s channels B and C are assigned to these addresses. This leaves channel 28 available.

Channel 28 is split into channels 44 and 60 (each 2.84 Mbit/s). The two 2.5 Mbit/s channels D and E are assigned to these addresses. No free capacity remains.

The LRC channel is assigned to address 16. As explained earlier, this is of no consequence to the operation of the rest of the channels.

In this example, the bandwidth utilization is only 56.5%, or even 51.4% referred to the link native bit rate of 100 Mbit/s without LRC. This is mainly due to the requirement of a large bandwidth (30.00 Mbit/s) channel that does not match well with the available data rates (45.45 Mbit/s).

Note that the bandwidth allocation technique is also well known for allocation of computer memory, and some disadvantages carry over as well, such as potentially a considerable amount of unused bandwidth. If a set of channel requirements with arbitrary bit rates is applied, the bandwidth usage will be between 50% (bit rates are all just beyond power-of-2 ratios) and 100% (bit rates match perfectly to power-of-2 ratios). On average, the utilization is 75%.

However, in the XC system, the efficient usage of bandwidth is subordinate to a well-structured bandwidth allocation strategy as described above, ultimately allowing a faster and more cost-efficient development of industrial control networks.

When the bandwidth usage is nevertheless unacceptably low, it is possible to assign more than one channel for the transfer of a single data stream. The bits of the data stream are then distributed over the resulting channel group, allowing the allocation of a bandwidth fraction that is not a power-of-2 of the link bit bandwidth.

Channel groups can be created using multiple channels of the same bit rate, multiple channels with all different bit rates, or a combination thereof.

For example, if the link bit rate is 250 Mbit/s, the allocation of a 10 Mbit/s data stream would require a 15.625 Mbit/s channel (Q=4, R=1/16), leading to 5.625 Mbit/s or 36% of unused bandwidth that cannot be allocated anymore.

However, transferring this data stream with 3 3.91 Mbit/s channels (1/64, N=6) leaves only 14% of the allocated bandwidth unused. Obviously, the same result would be obtained when using one 7.8125 Mbit/s channel (N=5, R=1/32) and one 3.91 Mbit/s channel.

This example also highlights the somewhat limited effectiveness of channel group allocation. Although the unused bandwidth is reduced from 36% to 14%, the added (hardware) complexity for decoding more than one channel in a channel group may actually offset the advantage. The usefulness of a channel group allocation therefore highly depends on the actual bandwidth to be allocated and how much excess overall bandwidth is available.

Another advantage of the use of $M=2^N$ is that it significantly facilitates the detection of bits in an XC channel and the recovery of the channel bit index. In a binary number representation, the i mod $2^N$ operation comes down to simply taking the N rightmost bits from the link bit index. Similarly, the i div $2^N$ operation comes down to shifting i to the right over N positions, i.e. taking all bits that were not used by the modulo operation.

A digital circuit, requiring a limited number of gates, can be used to detect the presence of an XC channel bit in an XC stream. A block diagram of this circuit, showing only its basic input and output ports, is given in FIG. 34. This circuit is the XC device interface. The XC device interface is arguably the most fundamental building block of XC system architectures.

The block has an XC stream output because it replaces bits in the stream when it is sending information. As explained before in the section "XC stream", multiple device interfaces can operate in parallel under certain circumstances, but in general, device interfaces are daisy-chained.

Whenever the bit link index in the XC stream matches the device interface XC address, the cdv signal ("channel data valid") is asserted. The address match involves continuously checking whether all XC address bits to the right of the first nonzero one match the corresponding XC stream index ad bits. This is possible with a simple combinatorial circuit.

Figure 35:
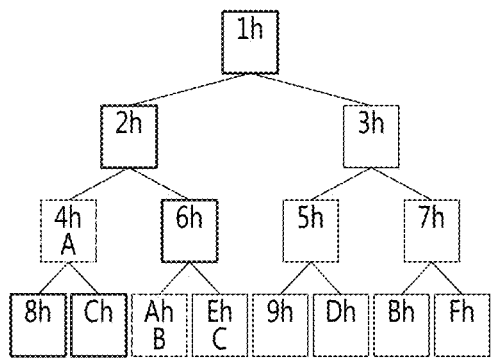
FIG. 35 illustrates an exemplary channel configuration.

To illustrate how a device can receive and send bits, a simple example channel configuration is used, as shown in FIG. 35. Three channels A, B, C with respective XC addresses 4 (04h), 10 (0Ah) and 14 (0Eh) are transferred in the same link. Channel A has a bit rate that is ¼th of the link bit rate and channels B and C have both a bit rate that is ⅛th of the link rate. First, an XC device interface is used to illustrate how a device can receive the C channel bits. Next, an XC device interface is used to show how a device can (re)write it.

Figure 36:
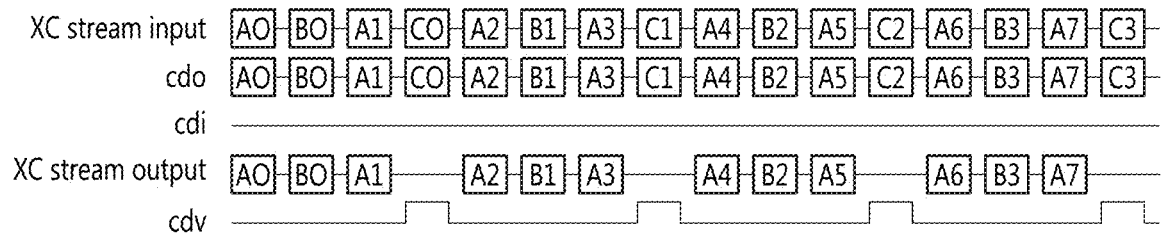
FIG. 36 schematically illustrates the transfer of bits from XC stream to device with cdo and cdv signals.

The device receives data bits through the cdo output port. This port is directly connected to the dd signal in the input XC stream, as illustrated in FIG. 36. The device simply copies the cdo bit as soon as cdv is asserted. During the period of the address match, the device interface also replaces the stream data bit with the value of cdi. Since the device does not drive the cdi signal in this example, an 'unknown' value is inserted (neither low or high level).

Figure 37:
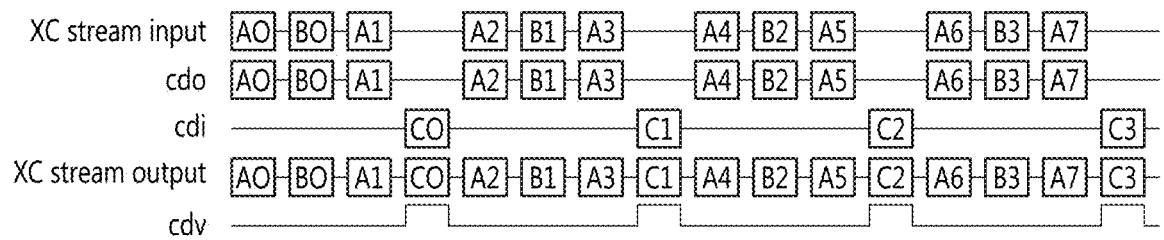
FIG. 37 schematically illustrates the transfer of bits from device to XC stream with cdi and cdv signals.

The device transmits data bits through the cdi input port. It is more clear to illustrate this with an input XC stream without a C channel in it, as shown in FIG. 37. The device presents the bits of the C channel whenever the cdv signal is asserted. Since, in this implementation, the device interface only enables transmission of the cdi bits when cdv is asserted, the device may actually present the bits earlier and also continue presenting them after transmission. This reduces the setup and hold timing requirements for the device.

Figure 34:
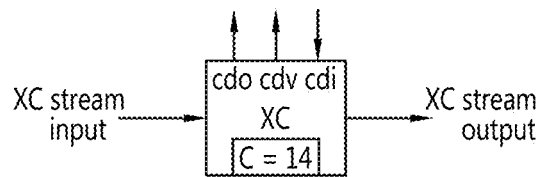
FIG. 34 illustrates an exemplary XC device interface with basic I/O.

The block shown in FIG. 34 includes support for XC streams that transfer $W=2^N$ bits per clock cycle. Again, the cdv signal is asserted whenever the XC address matches, but the last N address bits determine which bit of the W bits wide dd signal is copied to and from cdo and cdi. Again, this is a straightforward implementation using a W to 1 multiplexer made possible by the use of $M=2^N$.

A more complex XC device interface also provides the channel bit index, which is just the link bit index right-shifted over the channel order.

Figure 38:
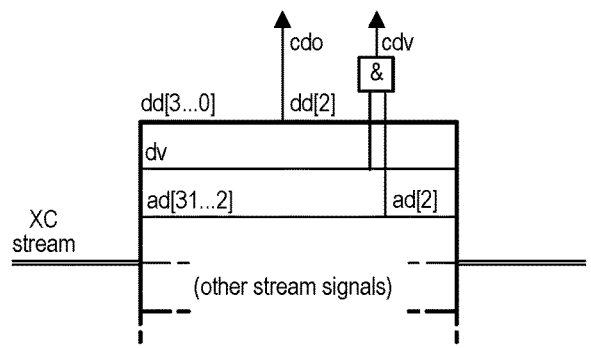
FIG. 38 presents an exemplary XC device interface with fixed XC address 14 (0Eh)

Many XC device interfaces, in particular the ones used for detection of LS1, LS2, LRC and LR1, are configured with a fixed XC address. This leads to significant hardware savings. For example, the fixed detection of XC channel 14 (0Eh=1110b) in a 4-bit wide ($W=2^N$ with N=2) XC stream is done as indicated in FIG. 38. With W=4, there are always 4 bits transferred per device clock cycle. In an XC stream, the bits are aligned with respect to their bit index and the link bit index therefore always ends in N zeros. which can be omitted, as is done in FIG. 38.

The address 14 ends in . . . 10b, so it is always the second data bit dd[2] that is accessed. Consequently, cdo is the same signal as dd[2]. The cdv signal is the logical AND of the XC stream dv signal and the ad[2] link bit index. Thus, only one gate is needed to access channel 14 in this case, clearly indicating the hardware saving.

Quite often, XC devices also operate within a limited range of bit rates. The XC device interface must then support only limited shift operations, again leading to important hardware savings.

In the description of the XC channel decoding it was shown that only a limited number of bits in the binary representation of the link bit index is needed for XC channel detection, namely the N−1 rightmost ones. This means that the XC system can operate with a XC link bit index counter having only a limited number of e.g. 32 bits.

The number of required XC link bit index bits depends on the required range of $M=2^N$ of the channels actually used, the amount of channel bit index bits (channel bit index width), and the time range in which event times must be specified, since, as explained above, the link index also serves as a time base.

For example, the XC data channel with address 1816 (11100011000b) has M=1,024 or N=10. If the XC link bit index width is 32, such a channel will have 32-10=22 bits available for its channel bit index. Note that, with an XC effective link bit rate of 90.90 Mbit/s, the bit rate of this XC channel is 88.8 kbit/s. In this example, wrap-around of the link bit index occurs every 39.04 seconds, which is long enough for scheduling events in a control system.

Note that in state-of-art digital systems, there are no practical limits for the width of the XC link index. It is an important advantage that peripherals must only implement the amount of XC link bit index bits they need. A peripheral can therefore use only a 16-bit counter while the rest of the system uses 64 bits as a link index. Since the stage 2 synchronization channel LS2 carries the least significant bits first, the peripheral does not even need to be aware of the system-wide link index width.

The use of $M=2^N$ provides also an elegant solution for the XC link bit overflow. When N bits are used to represent the link index, it must simply increment modulo 2N. For example, when N=8, the link bit index must count from 11111111b to 00000000b. In the state-of-art implementation of a digital counter, actually nothing must be done to obtain this behavior.

XC Channel Rate Transitions with $M=2^N$

The use of a routing table for rate transitions in the XC system has been explained above. The use of $M=2^N$ enables a much simplified implementation of the buffer memory and the routing table, since the lower order link index bits can be directly routed to the buffer and routing table memory address lines.

XC Channel Memory Mapping with $M=2^N$

Large section buffers, i.e. buffers having a large number of entries $N_S$ that is also a power of 2, enable efficient, i.e. concentrated and aligned, spatial channel bit distribution in the host buffer, even for channels with large order. For example, when mapping a channel of order 9 (1/512th of the link bit rate), a section buffer containing 4,096 bits (512 bytes) is minimally required to reassemble 8 channel data bits into a contiguous 8-bit word.

Since the section buffers only need to store a single bit per entry, the memory requirements are limited and scale linearly with the section size $N_S$. In FPGAs, a commonly encountered memory block size is 8,192 bits, so even quite large section buffers only use a single memory block. A second port of the memory block typically is up to 64 bits wide, allowing efficient data transfer to and from the processing unit.

Arguably the most important advantage of using $M=2^N$ is the reduction of the bit address translation table memory requirements from $N_S \log_2(N_S)$ to $N_S \log_2(\log_2(N_S))$.

While the bit address translation table needs the same amount of entries as the section buffers, it must store a number of bits per entry that is sufficient to index the entire section buffer. The memory requirement is therefore $N_S \log_2(N_S)$. When $N_S=4,096$ the memory needs to be 12 bits wide. Since the FPGA memory block data width must be a power of 2, a minimal width of 16 bits must be used. An FPGA implementation of the bit address translation table with 4K entries would therefore require 10 memory blocks, 8 of which would be used by the bit address translation table, which is four times as much as required by the two section buffers alone.

An implementation with $N_S=8,192$ would even require 18 memory blocks, no less than 16 of which would be used by the bit address translation table.

Instead of storing the section buffer index for each of the $N_S$ XC composite channel bits, the use of $M=2^N$ enables a bit address translation that relies on storing the order $N(c)$ of the XC channel c each of the $N_S$ bits belongs to.

To determine the section buffer target address b of a bit belonging to XC channel c with channel bit index j, the $N_S$ lowest bits of j are simply rotated right over the order N. The N leftmost bits of this value are mirrored and the resulting value is used as a bit address into the section buffer.

Figure 40:
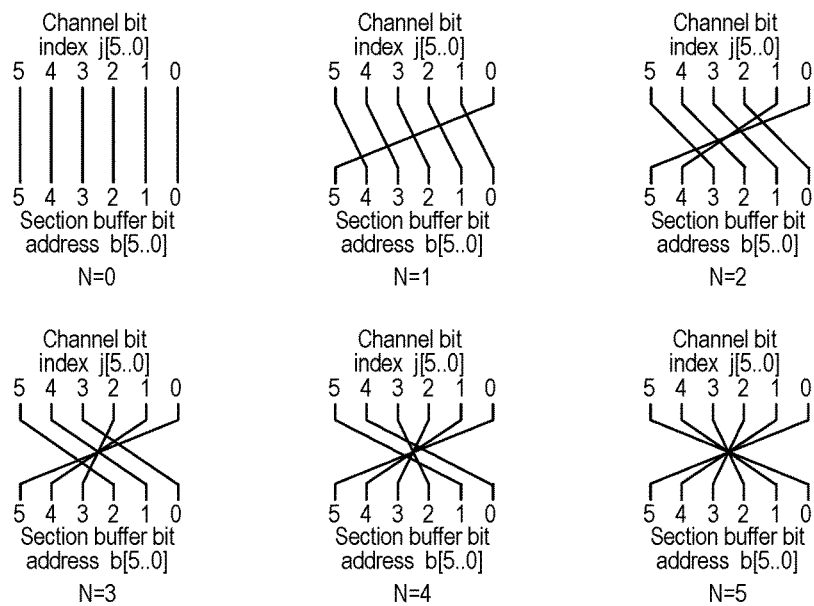
FIG. 40 illustrates derivation of section buffer address b for N between 0 and 5.

The process is illustrated for $N_S=64$ and a host buffer of 1 MB in FIGS. 40 and 41. Because $\log_2(N_S)=6$, only the 6 rightmost bit index bits need to be translated.

Figure 39:
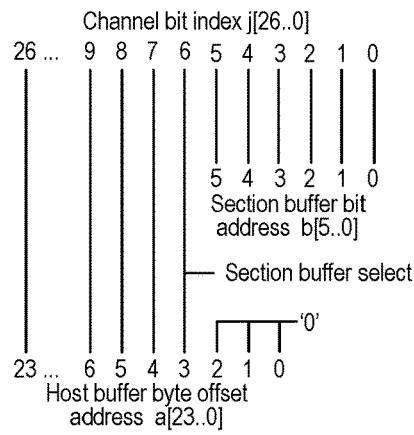
FIG. 39 illustrates the derivation of host buffer address offset a and section buffer address b from channel bit index j.

As shown in FIG. 39, the majority of channel bit index bits j (21) directly determine the section buffer address a (as a byte offset) in the host memory. a[2 . . . 0] is hardwired to "0", indicating that the section buffers are 8 bytes long, as can reasonably be expected with $N_S=64$.

The lower 6 bits of j are translated to a section buffer bit address b according to FIG. 40, using a value N stored in the bit address translation table for each XC composite channel bit index. Since only 6 values need to be encoded, 3 bits are sufficient for j, also allowing a value of −1 to indicate an unused channel.

It is convenient to use j[6] also for selection of the section buffer, although this is not always possible when delay compensation is used.

FIG. 41 shows the resulting host buffer layout when the bit address translation is disabled, i.e. N=0 for all channel bit indices, when mapping the XC composite channel introduced as an example in the section "XC system implementation with $M=2^N$". In this case, the A, B and C channel data is fully interleaved in the host buffers. At the left of the figure, the transfer start and stop times of each section are shown. The numbers at the right indicate the bit start positions.

The routing table contains as many entries as the section buffer (64). By default, it is filled with a value indicating the absence of a channel. In this example, the value −1 is used.

For every channel that forms part of the mapped composite channel, the translation table entries corresponding to the channel bits are simply filled with the channel order. Taking for example channel C (XC address 14=0Eh=1110b), the order is 3, since bit 3 is the leftmost one. Therefore, the value 3 is filled in every table entry where the address ends in 110b. This process is very similar to the channel detection described earlier in the section "XC system implementation with $M=2^N$". The result is shown in FIG. 42. This table also shows the XC channel data delay compensation field, which is currently 0 for all entries.

The entries corresponding to channel A (order 2) are 000h, 004h, . . . . The entries corresponding to channel B (order 3) are 002h, 00Ah, . . . . As explained before, the channel C entries are 006h, 00Eh, . . . . Unused entries keep the order −1.

Using this table to translate the 6 least significant bits of the channel bit index into the channel order, and using the channel order N to permutate the channel bit index according to FIG. 40 into a section bit address, the following host buffer layout is obtained.

FIG. 43 clearly shows how alignment has been achieved for this example. A processing core requiring access to channel A needs only 1 host memory access to retrieve 16 bits, at the expense of the 1.02 μs delay needed for mapping the composite channel data in a section buffer.

In FIG. 44, the bits belonging to the same channel have been grouped, leading to a much more readable host buffer layout.

Until now, the XC composite channel 1 has been mapped. FIG. 45 depicts the layout of the buffers when mapping XC composite channel 2 instead, leading to half of the bandwidth usage.

FIG. 45 contains two host buffer layouts. The left one uses the same section size of 64. The advantage is that the spatial distribution of the channel bits is more concentrated. For example, channel A data is now accessible by a process as a full 32-bit word, whereas this was only a 16-bit word in the mapping of channel 1 using a 64-bit section. Also, the number of transfers performed over the host peripheral bus is halved. On the other hand, the section transfer delay is doubled to 2 is.

If this delay increase is unacceptable, the section size can be reduced to 32, leading to the right host buffer layout instead.

Allocation of channels and selection of the composite channel mapping is part of the design of an XC network based control system, and the ability to make an easy trade-off between mapped channel word size and the transfer delay is important to design well-performing control or data acquisition system in a multitude of applications.

Summarizing, using the example above, it has been shown that the bit address translation table now needs to contain entries that are only $\log_2(\log_2(N_S))$ bits wide. This leads to a significant reduction of the amount of memory required to perform the memory mapping, which is especially important for XC network peripherals using embedded local processing systems.

In the case at the beginning of this section, for $N_S=4,096$ a table width of 4 bits is now sufficient for a section buffer size up to 64K entries. The total number of blocks required is now 4 instead of 10, or 6 instead of 18.

The reduction of the amount of memory blocks also allows the use of multiple mapping units in a single process interface. In this case, one unit can map an XC composite channel containing a limited number of fast, low order channels to a host buffer using small sections in order to keep the transfer latency low. At the same time, another unit in the same process interface then maps another XC composite channel containing many slower, high order channels using large sections. Since the mapped channels are slower in the latter case, the latency increase is often acceptable.

Using $M=2^N$, the bit at position N of j can be used directly to determine which section buffer is used to exchange XC data. When a section buffer is done, it is scheduled for data exchange with the host buffer, either for reading of data for transmission, or writing of data received.

As already indicated in the example in FIG. 39, the byte target address of that section buffer transfer in the host buffer is also derived directly from the channel bit index. In this case, the number of sections in a host buffer must also be a power of 2. Each host buffer can have an offset, i.e. start address, in the host memory. The offset is configured once in the process interface and remains unchanged during operation of the interface.

Since the host buffers can contain several MB of data organized as a circular buffer, they are not refreshed at high speed and additional software can be used to translate XC channel indices to host buffer addresses if, for some reason, the number of sections in the host buffer is not a power of 2.

Host memory is often implemented using dynamic RAM, which is extremely cost-effective. In that case, there is little reason not to have a number of sections in the host buffer that is a power of 2.

It has been mentioned above, in in the section "XC link rate transitions", that XC channel rate transitions potentially cause XC channel bits to be delayed. The effects on a native data channel are limited to a bit shift, but if a composite channel is delayed, the channel layout is also affected.

For example, when channel 2 in the example above is transmitted and received back over an XC link with half of the bandwidth, the stream could be delayed by 1 bit, as illustrated in FIG. 46.

As can be seen, a bit delay of 1 has a profound impact on the structure of the XC stream. Whereas the contents of channel 1—which is unused in this example—remain unaffected, access to the A, B and C channels is no longer possible using their original XC addresses.

When the delay is 2 bits, the situation is as shown in FIG. 47.

In this case, the XC address for A is unaffected, but its channel bits are delayed by one, and the original B and C addresses are still invalid.

Clearly, a method is needed to compensate for these offsets and address modifications. In finding a method, it is an advantage that, once the XC network system links are synchronized, the delays remain fixed.

Even if synchronization would be lost, the XC link interface management blocks can be instructed to reestablish a previously established delay. Similarly, the link interface management blocks can be queried for the existing delays after link synchronization. In fact, this information can be derived from the XC link bit index of each individual link.

When the delay is known, the first step is recalculation of the channel addresses. The modulus $M_D$ of the delayed composite channel D is multiplied by the channel D bit delay d, providing a number of absolute bit shifts b that is incurred by all native data channels inside D. Recall that $M_D$ is simply the repeating bit distance of channel D. Since, in general, $M=2^N$ for all channels, $M_D=2^N(D)$, with $N(D)$ the order of D. Thus:

$$b=M_D d=2N(D)d$$

This absolute offset b is added to all native data channel remainders $R_k$ according to:

$$R_{k,new}=(R_k+b) \bmod M_k$$

The channel bit delay $d_k$ is then given by:

$$d_k=(R_k+b) \text{div } M_k$$

Although, preferably, $M=2^N$ for the XC system, the modulus and remainder notation has been used momentarily here for clarity. Recall that an XC address is simply:

$$A=R+M$$

In the examples for 1- and 2-bit delays, the absolute bit shift is 2 and 4 bits, since the modulus of channel 2 is 2. Tables 2 and 3 show the adjusted addresses for the native data channels in both examples.

TABLE 2

Adjusted channel addresses with channel 2 delayed by 1 bit

| Channel | XC address Original | XC address Adjusted | Absolute bit shift b | Channel bit delay d |
|---|---|---|---|---|
| A | 4 (4h) | 6 (6h) | +2 | 0 |
| B | 10 (Ah) | 12 (Ch) | +2 | 0 |
| C | 14 (Eh) | 8 (8h) | +2 | 1 |

TABLE 3

Adjusted channel addresses with channel 2 delayed by 2 bits

| Channel | XC address Original | XC address Adjusted | Absolute bit shift b | Channel bit delay d |
|---|---|---|---|---|
| A | 4 (4h) | 4 (4h) | +4 | 1 |
| B | 10 (Ah) | 14 (Eh) | +4 | 0 |
| C | 14 (Eh) | 10 (Ah) | +4 | 1 |

For device interfaces as shown in FIG. 34, it is sufficient to use the adjusted XC address instead of the original one. For the process interfaces with a memory mapping, the routing table must be altered for the adjusted new addresses, but the software processes must obviously be notified and use the adjusted addresses as well.

The channel bit delay can be compensated by a device interface by subtracting the delay d from its channel bit index output. Still, device interfaces seldom need this support, since the delays are usually incurred in the data transfer from the devices back to the processing unit, which commonly contains a memory mapping unit. The memory mapping unit can sometimes compensate for channel bit delay by moving the bit address translation table entries accordingly. This can only be done when the order of the mapped channel is fairly low with respect to the section buffer size $N_S$. Only in this case, there are a sufficient amount of translation entries in the table to rotate them and realign the channel data to e.g. a byte boundary for the host processor.

In the general case, the bit address translation table not only includes the native data channel order, but also a bit offset field, allowing the memory mapping unit to place the bit in the correct location. More details are given in the upcoming XC system interfaces section. This relocation is the main reason for having more than 2 section buffers in a memory mapping unit, since a bit may be located in a section that is different from the one that is actually filled.

The memory mapping unit must also be informed of the additional delay it must observe before exchanging section buffers with delayed bit updates with the host buffers.

Note that the delays can become larger in practical applications where rate transitions are made from fast XC links to slow ones containing many XC network nodes.

When the section buffer size $N_S$ is small, or the mapped channel order is large, it is possible that, per section, a number of channel data bits is transferred that is smaller than the smallest word size that can be handled by the host processor. The mapped channel is said to be scattered in this case.

For example, consider the mapping of XC channel 1 (the full stream) in the preceding examples using sections of only 32 bits, in which case only 4 bits of data channel C (14=0Eh) would be present in each section buffer as indicated in FIG. 48. The host software must then reassemble a full word from multiple 4-bit fragments C[3 . . . 0], C[7 . . . 4], C[11 . . . 8] and so forth.

Although this may seem an inefficient solution, the XC system memory mapping ensures that these 4 bits at least are always adjacent, avoiding the extremely inefficient interleaving operation in the host processor.

Scattered XC channel mapping also only occurs for channels with relatively high orders. Therefore, the computational effort for reassembly is limited to one word per section buffer. This is in contrast to the direct mapping, in which the largest reassembly effort would be required by the fastest channels.

It is also possible that a mapped XC channel has only a single data bit in a section, or, in general, one in every 2N sections. The host software must then reassemble these bit by bit, but sections containing no bit obviously need not be accessed.

If the number of scattered mapping is too large, the system designer may choose to use an additional mapping unit with large section buffers, assuming that one is available.

It is a very interesting option to use XC link mapping for support of management and link support channels. Channels supporting link establishment synchronization (LS1, LS2 and also LR1, LR2 and LR3) can be actually implemented in the host buffers, reducing hardware requirements for the XC system network node considerably.

Note that this support is not limited to the local network node alone. The control channels in secondary XC streams behind a rate transition node can also be generated on a processing unit generating the primary XC stream using the mapping unit.

XC Events with $M=2^N$

Events are generated by transferring a continuous series of digital words to a device using a channel, the words containing the time of an event in a short period (the 'event horizon') following the transfer of each time value. Conversely, events are detected by transferring a continuous series of digital words from a device using a channel, the words containing the time of an event in a short period preceding the transfer of each time value.

If it is necessary to indicate the presence of an event, the most significant bit indicates whether ("1") or not ("0") an event is actually represented by the time value. While the use of the MSB for this purpose may seem wasteful, it is unavoidable since the number of possible time instants in the word's time period is always a power of 2 and each value from 0 to $2^N-1$ signifies a valid event. Therefore, a bit must be added to qualify the event as valid. A continuous series of "0" bits represents the absence of events, and is a useful default value for channels transferring event data.

By this definition, the average number of events that can be generated or detected per unit of time (the 'event rate') is limited by the number of time values that are transferred by the channel. The event rate therefore depends on the bit rate of the channel and the number of bits used to represent a time value. The number of bits obviously also depends on the event horizon and the required time resolution.

For the acquisition of measurement data at precise time instants, events are equidistant in time. In these cases, the horizon only needs to cover the time period of a single time value.

For the generation of pulse width modulated (PWM) signals, the events occur in repeating, equal periods of time. Unless the periods coincide with the periods at which the time value is transferred, the horizon must cover the time period of two (2) time values. Note that in this case the latency also increases from 0 to 1 time value in order to put at least two events arbitrarily close to each other.

For the generation of event patterns where the average frequency of events is limited, but where the events can occur in a relatively short time period, the horizon may be even larger.

Since the channel bit rates are a power of 2, the bit width W of the time values, which are usually 8, 16, 24 or 32 bits, is very effectively used. With L being the link bit rate, N(c) being the order of the event channel, and T being the average period of the event, the following relation must hold:

$T \geq 2^{N(c)} W/L$

Additionally, with H being the horizon, the latency $T_{latency}$ is:

$T_{latency} = 2^{N(c)} WH/L = TH$

At the same time, the event time resolution r is:

$r = 2^{N(c)} WH/2^{(W-1)} L$

Note the W−1 power which takes in account the use of the most significant bit of the time value to indicate that it represents an actual event.

The above equations can be used to determine which W and N(c) parameters must be selected for given L, T, H and r values. For example, with L=250 Mbit/s, T=100 μs, H=2 and r=10 ns, it follows that when W=16, N(c) must be at most 10.

For completeness, the validity of the event value can also be indicated by a bit in a separate, lower-rate channel, or by an event value in the range which is outside of the used horizon.

Events are detected in the same way they are generated. Examples of events include a signal transitioning from a low to a high state (rising edge), from a high to a low state (falling edge) or both. In the latter case, the type of transition can be encoded in the time value as well, e.g. by using the second most significant bit, while the most significant one is still used to indicate occurrence of an event.

When more events occur than can be accommodated, it is usually most useful to drop the oldest event, allowing an algorithm to determine reliably the time of the latest events.

A specific problem for event detection is that a software algorithm must traverse all event time words received to ensure that all events have been detected. Especially with high bit rate event channels, rarely occurring events and algorithms running at low rate, this approach is inefficient.

In this case, the number of times an event has occurred can also be transmitted using a device interface. When words of N bits are used, the event counter is incremented modulo $2^N$, causing a rollover after $2^N$ events have been counted.

A software algorithm therefore only needs to read the last event count received and compare it to the previous value. If they differ, it can use a binary search algorithm to locate the time frames in which the event occurred.

If the event count channel is updated at the same rate as the event detection channel, the exact event time can be retrieved immediately. Otherwise, only a limited time range must be searched linearly.

Obviously, the algorithm must check for event occurrence at multiple points in time spaced no further than the minimum time it takes the counter to roll over.

Event count channels can be conditional, i.e. the may only count edges on a signal, while at the same time, the value of another signal is either high or low. Such event counting channels can be used to read incremental encoders using less bits than needed for their full range.

Combining the event detection and event count channels, a software algorithm can reliably retrieve the time between a number of events that is larger than one, i.e. when the events occur faster than the allowable number in the event detection channel.

Protection of Gate Drive Signals

If the present invention is applied in the context of power semiconductor switches, an erroneous event generation due to a data error can have disastrous consequences. In an embodiment of the invention, events are triggered using the link index, whereby two channels are used to schedule the times at which to switch on and off, respectively, and an optional additional channel is used to protect the two aforementioned channels with a SECDED ("single error correction, double error detection") code transmitted at an equal or lower bit rate (e.g., two 16-bit channels carrying the time stamps and one 8-bit channel carrying the corresponding correcting codes). As systems according to the present invention spread the bits in time, providing inherent interleaving, error bursts are evened out and the effectiveness of the SECDED method is maximized (since it is likely that, even when a group of bits is damaged, only 1 bit of both event channels and the correction channel, is affected, thus allowing the SECDED method to restore it).

At a more generic level, the present invention may be implemented in such a way that a certain channel transports data bits, and a secondary lower-rate channel signals the validity or presence of the data bits.

Emergency Shutdown

The XC system uses SFD and SFR channels for implementation of a safe and dependable failure detection mechanism, which is often essential in power conversion applications. The Secure Fault Detection (SFD) channel is a chain-routed along all devices that must be able to signal a fault condition. The Secure Fault Reporting (SFR) channel broadcasts the SFD chain output result. The SFD channel is routed along all devices, which requires a common bit rate. A canonical implementation uses a 500 kbits rate for SFD and SFR, occupying 6.4% of the bandwidth of a 15.625 Mbit/s copper link.

Because memory mapped devices (like the processing host) can have a significant delay (several 10 μs to 100 μs) from input to output, they should be traversed first by the SFD chain, followed by the hardware device interfaces, which have minimal delay.

Since the SFD channel is in a chain, fault conditions cannot be observed by upstream devices. Careful placement of devices can be used to implement a fast fault detection in at least one direction, a feature which is used by the gate drivers in bridge configuration.

After the SFD chain has been traversed, it is broadcast again as the SFR channel, using a rate transition block with a ratio of 1. Since the SFR channel is not a chain, the propagation time in this channel is shorter. The result is that all XC device interfaces can observe faults announced in the SFD chain with a deterministic amount of delay in the SFR channel.

The SFD channel consists of a data stream with an initial random frame of 32 or 64 bits. That frame is then multiplied, still in the host memory transmit buffer, into the next frame by all software processes which are essential for the safe operation of the converter system. Each process has a prime factor associated with it, which is used to sign relatively large sections of the stream periodically on the host. After being sent by the XC interface, the SFD channel is routed along all devices that report a safe operation condition by multiplying with their own prime number.

When a severe error condition is detected, a device can respond in 3 ways on the SFD channel:
1. it continues to sign with a different signature, allowing to specify the cause of the error;
2. it deliberately flips the bits of a correctly signed stream, causing detection of the error within 2 channel bit times. (When the devices are resilient against single bit errors, 2 is the minimum.) This is a good solution for gate driver error detection;
3. it simply stops signing and forwards the stream or a constant value. This is a good solution for mechanical safety switches, allowing them to simply cut power to an encoding circuit in case of an emergency stop condition. When the switch is opened, the signing circuit is no longer powered, which physically prevents the signature (which is only stored in the signing circuit) to be applied any longer.

The signing keys would normally be e.g. 32-bit or 64-bit prime numbers, allowing guaranteed detection of the absence of a signature within 64 us. If the sequence at the host is random, there is even less chance that the secure stream detection would accidentally be fooled by a stuck or repeating pattern.

The XC system or XC device designer may impose a certain order in which the devices process the SFD stream. In this case, a severe error condition on an upstream first device can be guaranteed to be detectable on downstream devices already on the SFD stream, without the delay that would otherwise be incurred by observing the looped-back SFR stream. This method is used for gate driver device fault detection.

Performing the secure fault detection and reporting in 2 stages gives the host controllers the option to either sign the stream in large or small sections. Large sections reduce the CPU load, but also increase the period in which the controller may not be operating properly without being noticed. Short sections increase the CPU load, but failure of the controller to update the secure fault detection channel is detected much earlier.

Devices that act on the SFD include measurement modules which detect excursions of the measured value beyond programmed limits.

Note that this system also allows to verify the correct operation of a measurement module before a power conversion system is enabled, since the required keys are only loaded in the measurement module after a successful test and configuration.

Links with Symbol Encoding

In the embodiments disclosed above, the channels undergo a transformation of the first string of symbols into a second string of symbols, the second string of symbols having higher entropy than the first string of symbols, for example through multiplicative scrambling or encryption. The high-entropy sequence thus obtained facilitates the recovery of symbol synchronization at the receiver side.

This transformation is not always necessary, as certain types of symbol encoding inherently provide ways to recover synchronization. The XC system can make efficient use of links with such symbol encoding, such as 8b/10b or 64b/66b. In this case, control symbols (i.e. 'comma' symbols) can be used to implement the LS1 channel.

The resulting method is outlined hereinafter for an 8b/10b symbol encoding, without loss of generality.

In 8b/10b-encoded links, the 'D' group contains 256 10-bit symbols, allowing the transmission of any regular 8-bit data word (byte). The 'K' group of symbols includes symbols that are unique in a sequence and some allow a receiver to align the 10-bit symbol boundaries, but there are only 10 (12) of these symbols available.

So, while a 'K' group symbol already determines an 8-bit boundary in an XC link, it could also be used to mark e.g. a 64-bit boundary like the LS1 channel. However, since at most 12 different 8-bit words can be transmitted as a 'K' word, the 8 bits corresponding to the 'K' word cannot be used as channel bits.

This problem is in fact easily solved by defining these bits as belonging to 8 LS1 channels, namely LS1.0 . . . LS1.7. With 64 bits in a frame, this corresponds to the channel range 0x40 . . . 0x47. This also means that the 1, ½, and ¼ bit rates are not available anymore. On the other hand, the 10 (12) control symbols can be used to encode at least also the LS2 and optionally also the LR1 channels.

Note that the maximum bit rate limitation is not problematic, since the 8b/10b encoding is mainly relevant for Gigabit SERDES links that have been hardware optimized to receive an 8-, 16- or 32-bit word per system clock cycle using 10, 20 or 40 link bits. It is also evident that in this case, a frame synchronized by LS1 would be 256 or more bits long. For a 4 Gbits/s link bit rate, a ⅛ bit rate corresponds to a 500 Mbits/s channel, which is sufficient for the majority of applications.

In this case, the LR1 channel also announces an 8-, 16- or 32-bit 'stuff-word' instead of a single 'stuff-bit', in order to avoid the skipping of a single bit for rate control. Otherwise, a significant amount of digital logic would be needed since 32 bits are processed in parallel and skipping one would require 32 1-of-32 multiplexers. For 8 bits, it would require a more manageable 32 1-of-4 multiplexers. For 32-bits, no multiplexer is needed at all. This comes at the cost of an increased amount of jitter on the logical link bits, but the jitter can be kept below 1 bit ('stuff-words' of 8 bits) since the higher bit rates cannot be used anyway due to the 8b/10b encoding.

If the 'stuff-word' occurs right before the LS1 word, an LR1 might not be required at all since a receiver can deduct from the additional non-'K' word arrival that a stuff word was inserted by the transmitter. However, it is recommended to continue and use one or more LR1, LR2 and LR3 channels for immunity against single-bit errors since a single-bit error can cause a data word to become a control word.

General Observations

The XC access protocol presents a few notable differences relative to traditional synchronous Time Domain Multiplexing (TDM) methods using bit interleaving. Traditional TDM accommodates multiplexing of channels with different speeds using multiple slots for the faster channels, whereas the XC access protocol requires these to be interleaved at the slot level as well (and, hence, enforces a power of 2 channel bit rate ratio). Known TDM accommodates bit rate variation with bit stuffing at the channel level, whereas the XC protocol stuffs them at the frame level. Some frames are therefore longer than others, which causes difficulty for TDM methods to use a channel for frame synchronization, since they are no longer strictly periodic.

The XC system is not designed to ensure optimum link bandwidth usage. The rationale behind this design decision is that the current network bit rates continue to increase as the communication technology progresses, and a sufficient amount of bandwidth will remain available in the foreseeable future to tolerate a less than optimal channel bandwidth allocation. The design decision to forego optimal bandwidth allocation in favor of a structured allocation method, is valid because the XC system supports rate transitions, allowing the selection of different link technologies for different bit rate requirements.

Dynamic RAM memory cost has decreased to such an extent that the use of host memory buffers of several MB is perfectly valid. On the other hand, static RAM is more cost-sensitive, both on FPGA and ASIC.

Example Walk-Through

A single power electronic converter will be used to explain the principles of the XC system in detail, with particular attention on the use of multiple link bit rates. In this section, a walk-through is given, in order to highlight the fundamental operation of a power electronic conversion system based on the XC system.

Figure 49:
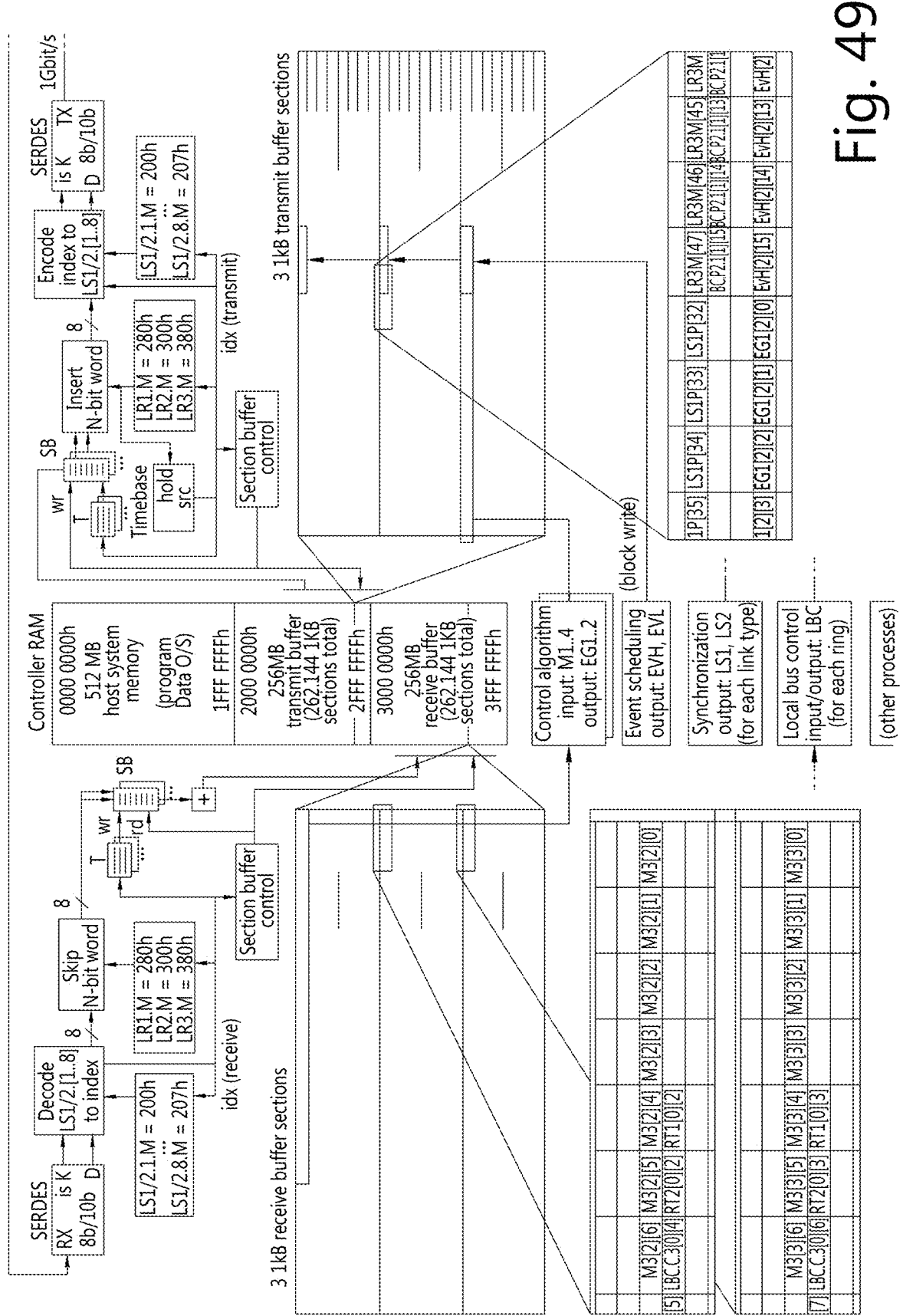
FIG. 49 illustrates an example implementation: controller host and XC process interface.
Figure 50:
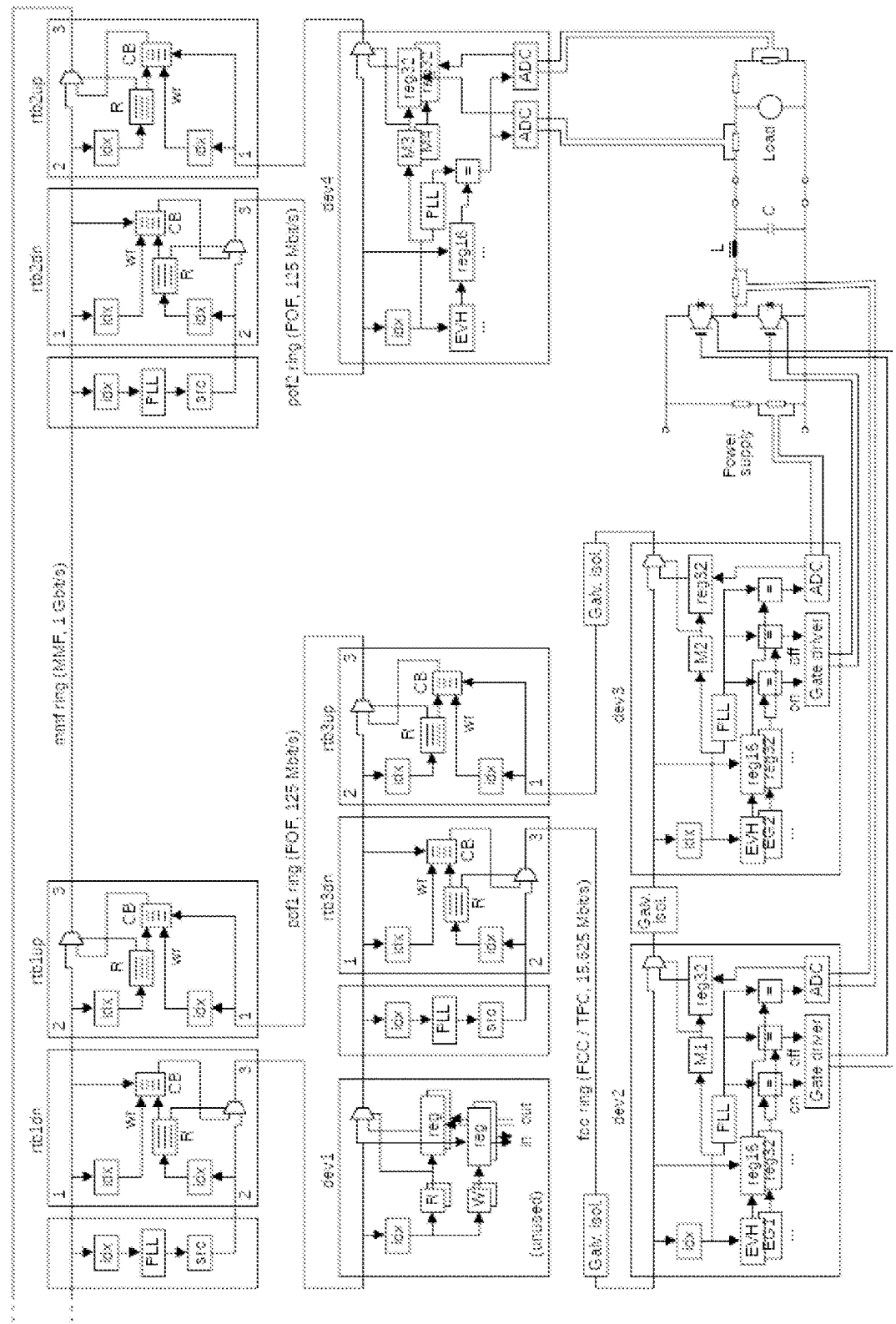
FIG. 50 illustrates an example implementation: XC ring networks, devices, and power converter.

The example power electronic system is shown in FIGS. 49 and 50. The power converter is situated at the bottom right of FIG. 50. Two power transistors (IGBTs) in a half bridge configuration connect the output filter, consisting of L and C, alternately to the power supply voltage (top transistor conducting), and to zero volts (bottom transistor conducting). The duty ratio of the top to switching period determines the output voltage that is applied to the load. This circuit can also transfer power from the load back to the power supply.

For the control of this system, the output current and the power supply voltage are measured, respectively by the ADCs in 'dev2' and 'dev3'. A control algorithm must process these values and produce new switching instants for the power transistors. The programmed instants are eventually executed by 'dev2' (for the top transistor) and 'dev3' (for the bottom transistor), which contain the necessary circuitry to drive the gates of the IGBTs. In this respect, 'dev2' and 'dev3' are called 'gate drivers', and the current and voltage measurements are also performed here as the gate reference terminals (the emitters) happen to be at the same reference potential as these measurements.

This application aims at a superior regulation of the load voltage. For this, additional, high-precision voltage and current measurements are carried out by the ADCs in 'dev4'. These measurements are located close to the load, somewhat away from the converter. The control algorithm also considers these measurements for improved load voltage regulation. For example, the algorithm may respond immediately to a load current increase, rather than observing the load voltage decreasing first.

The objective of the XC system is to provide a data network for transferring the measurements reliably to a central processing host, to allow different control algorithms to operate on the input data without interference, and then use the data network for transferring the calculated switch commands back to the gate drivers. For reasons of cost and scalability, the network is hierarchical and uses an interconnected ring topology, allowing a limited number of fast network rings to connect with slower network rings. In this example, 3 network speeds are used: multimode glass fiber ('mmf') at 1 Gbit/s, plastic optical fiber ('pof1', 'pof2') at 125 Mbit/s, and flat cable copper ('fcc') at 15.625 Mbit/s. For the XC system, it is easiest when the speed ratios are powers of 2.

The XC system uses routed channels between the controller host and the devices, with each channel having a data rate that relates to the link rate as one to a power of 2. Furthermore, an offset is specified at which the bits of a channel are located on an mmf, pof or fcc link. With these conventions, a channel can be fully specified with an integer number, such as 200h, which means that the channel is composed of bits that occur every 512-th time on a link. Channel 201h has the same rate, but its bits occur right after the bits of channel 200h. Channel 40h refers to every 64-th bit on a link. Channel 1 h refers to the link itself.

Note that channel 200h on 'mmf' can be related to 40h on 'pof1', since the rates are the same. This is the operating principle of the rate transition buffers that will be encountered below.

For successful decoding of the bits in a channel, the position number of each bit in a link must be known. An essential feature of the XC system is that this can be actually achieved with 1 (LS½ for mmf) or 2 (LS1 and LS2 for pof and fcc) channels. In the figures, 'idx' refers to the decoding of these channel to retrieve this bit index.

For the control of the number of bits per unit of time, the LR1, LR2 and LR3 channels are used to indicate when a bit must simply be skipped, leading to a reduction in transmission rate. This mechanism is only used on 'mmf', 'pof1' and 'pof2'.

Figure 51:
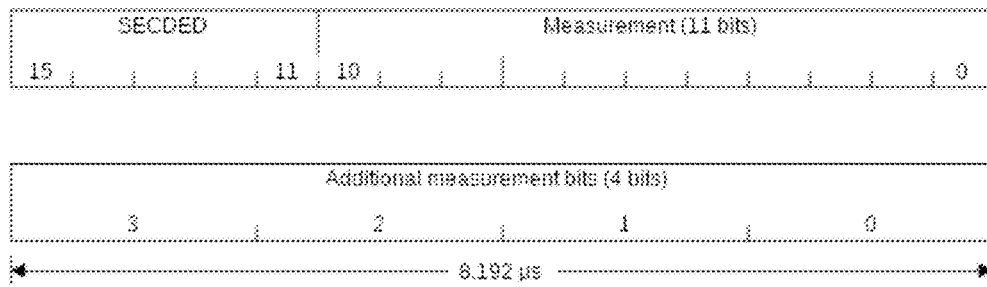
FIG. 51 illustrates 16-bit M and 4-bit augmented M channel layout.

In the XC system, the bits of a channel are evenly spaced apart and occur with near-perfect regularity. Even error bursts are likely to affect only a single bit in a channel, allowing—for each channel that requires it—to append Single Error Correcting Double Error Detecting (SECDED) codes to the channel data. The measurements taken by 'dev2' (M1) and 'dev3' (M2) consist of 11 data bits and 5 SECDED bits in a 16-bit frame as shown in FIG. 51. This figure also shows the use of a quarter rate channel to add 4 less significant bits to the 11-bit measurement. They are not protected by the SECDED code, but in case of a bit error, the error on the measured value is less than 0.025%.

Figure 52:
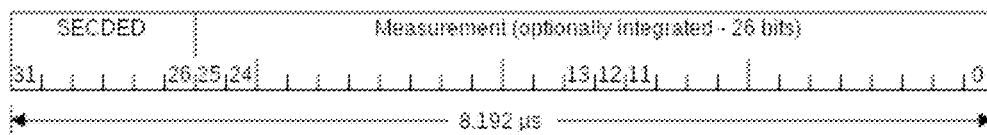
FIG. 52 illustrates 32-bit M channel layout.

The accurate measurements in 'dev4' (M3 and M4) consist of 26 data bits and 6 SECDED bits in a 32-bit frame as shown in FIG. 52. The 26 data bits are mainly intended for representing the integral of e.g. a 16-bit measurement, rather than the 16-bit measurement itself. This allows a controller process to read the measurement from two separate frames and obtain the averaged measurement value by dividing by the number of skipped frames.

Figure 53:
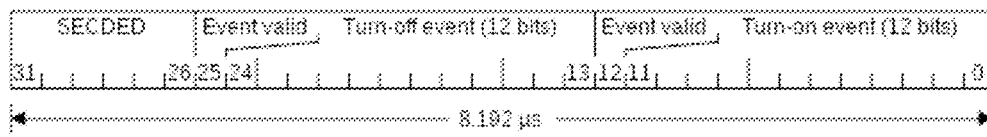
FIG. 53 illustrates EG1 32-bit channel layout.

The gate driver control channels (EG1 and EG2) consist of 2×13-bits for turn-on and turn-off events and 6 SECDED bits, also in a 32-bit frame as shown in FIG. 53. The 12 least significant bits indicate when the event occurs in course of the next 8.192 μs frame. If bit 12 or 25 are not set, there is no turn-on or -off event, respectively, in the next frame.

Figure 54:
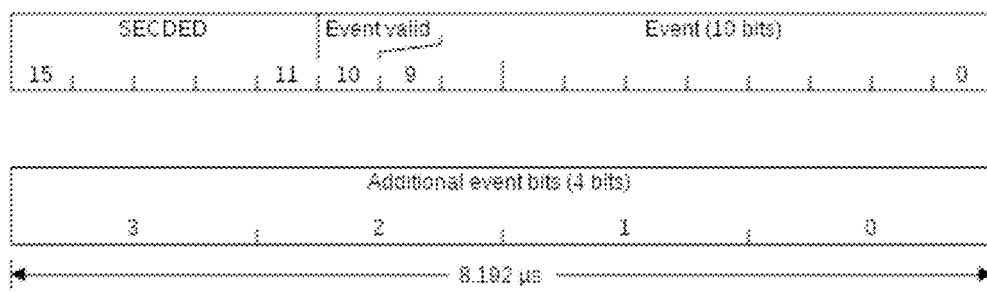
FIG. 54 illustrates 16-bit EVH and 4-bit EVL channel layout.

Measurements can be free-running, in which case a ADC conversion occurs every frame, but an event channel EVH, shown in FIG. 54, is used in this example implementation to trigger the conversion instead. It is similar to the EG channels, but uses half of the rate to transmit 16-bits in the same amount of time. Again, the resolution can be augmented from 8 ns to 0.5 ns by using a quarter-rate channel. Low-cost, low-performance devices may simply ignore this channel. Using this approach, the EVH channel can be distributed across the system.

The timebase for the event-defining channel is simply the link bit index 'idx', but for improved jitter performance or resolution, 'idx' is often followed by a Phase Locked Loop (PLL) as can be seen in the rate transition buffer blocks in FIG. 50.

FIG. 49 shows the memory and the processes running on the controller host (center), the XC receive interface (left) and the XC transmit interface (right).

If the bits from the 1 Gbit/s XC network would simply be copied into the receive buffer in the controller RAM, reassembling the channel data into words by the controller CPU would be very inefficient, since the individual bits of each channel are interleaved and a full-word read operation would be required for every bit received. Instead, the bits are first received into a small receive section buffer SB of 1 kB, into a location determined by the address translation table T. After the section buffer is completed, it is efficiently exchanged with a section in the 256 MB receive buffer using the PCI Express bus transport. The lower bits of the link bit index 'idx' of the incoming bits are directly used to look up an entry in the T table and determine the destination location in the SB. The higher bits of 'idx' determine which section of the receive buffer will be updated.

Consequently, there is a direct correspondence between a location in the receive buffer, the link bit index 'idx' and, since the bit index increases at a fixed rate, also the time. The execution of the control algorithm for the converter can therefore be scheduled using a timer, of which there is usually one available per CPU. By scheduling slightly ahead, the time between an asserted timer interrupt and the CPU actually executing the control algorithm, is minimized.

In FIG. 49, the algorithm accesses the memory locations containing the M1, M2, M3 and M4 received data words. Because of the translation table T, the bits which were originally evenly distributed in time are now aligned and available as 16-bit (M1 and M2) or 32-bit (M3 and M4) words. In the close-ups, it can be seen that subsequent buffer sections each contain an M3 frame (M3[2][31 . . . 0] and M3[3][31 . . . 0]).

When the channel bit rate is low, bits are still distributed across multiple sections. In the same close-ups, it can be seen that the RT1 channel only has one bit per section (RT1[0][2] and RT1[0][3]). The processor must still reassemble these words bit by bit, but this is less of an issue as RT1 is a slower channel. Alternatively, a second XC receive interface could be used to map a group of slower channels into another set of buffers at a lower rate or using larger translation buffers, allowing better grouping of the bits.

Since the translation table T points into a section buffer of 8,192 bits, the T table entries must be 13 bits wide. The use of the XC channel allocation allows the T table entries to contain only the rate of the channel each bit belongs to (requiring only 4 bits) in order to resolve the 13-bit destination address, saving on the amount of required T table memory. This also causes the location of the grouped bits in the sections (e.g. M3) to be dependent only and directly on the XC channel address.

The translation table T also contains a small offset field allowing a received channel that has incurred a few bits of delay in the network to be aligned again. The table shown in FIG. 55 shows the configuration of both receive ('Input') and transmit ('Output') translation tables in the example implementation. These are the actual channel definitions for the mmf ring network, which are used to create the T table entries.

For example, the 0110h entry is used to fill receive T table entries 0010h, 0110h, 0210h, . . . 1F10h with the number 8 (channel rate is 4 Mbit/s or $\frac{1}{2^8}=\frac{1}{256}$ times the mmf rate of 1 Gbit/s). The offset of −8 is also stored. Whenever the received bit index ends in
. . . bbbb bbba aaaa 0001 0000
the T table thus returns 8, and the target bit address into the 8,192 bit section buffer is:
. . . bbbb bbb0 0001 000a aaaa
which is obtained merely shifting the address part "a aaaa", that is within the 13-bit section buffer address range, 8 positions to the right. The shifted-out part "0001 0000" is bit reversed and placed before the shifted "a aaaa". The most significant bits remain unaffected. [NOTE—The offset is added to " . . . bbbb bbba aaaa", which can cause b to be altered. It is therefore possible that the interface is writing into 2 or more section buffers at the same time. In a practical implementation, the interface has a set of e.g. 4 section buffers, and only the one that is completely done is committed to host memory.]

Also of interest in FIG. 55 is the explicit presence of the LS½, LS1, LS2, LR1, LR2, LR3 channels for synchronization and rate control of every link type. These channels are initialized and maintained regularly by the process marked 'Synchronization' running on the host. The approach of programming them as regular channels saves a considerable amount of hardware.

There are also Local Bus Control (LBC) channels for every ring network segment. The process marked 'Local bus control' schedules 64-bit transmissions and reads back the 64-bit responses for accessing the local bus of each device, allowing other processes to query or configure the devices, but not in real-time since the bus is shared among processes. Typically, the XC addresses of channels used by devices, or the routing tables used in rate transition buffers are configured using this mechanism.

The EVH and EVH channels are handled by the 'Event scheduling' process, which programs the sampling instants of the ADC converters well in advance.

Because the 'Synchronization', 'Local bus control' and 'Event scheduling' processes access the host transmit buffer well before it is actually sent, or well after it has been received, these processes do not interfere with the real-time control algorithms.

When the control algorithm has finished calculating the duty factor for the half bridge, a small driver program is used to convert the duty factor into event data in the EG1 and EG2 channels, each scheduling the turn-on and turn-off of the top and bottom transistors respectively. The driver program may actually have to write EG words in multiple sections, although in FIG. 49, access to only one section is shown. Also observe how the algorithm writes sections with higher addresses than the ones it reads data from, reflecting the logical fact that EG1 and EG2 control values are applied later in time than the measurements were taken.

Soon after EG1 and EG2 are written, the 'Transfer buffer control' block moves the transmit buffer section into a section buffer SB. Similar to the receive operation, the bits are retrieved from the SB according to the translation table T, which is configured according to the 'Output' entries in FIG. 55. For example, whenever the transmit 'idx' ends in 70h, a bit from EG1 is transmitted.

The 1 Gbit/s mmf link type uses a SERDES with 8b10b encoding, which is why 8 adjacent LS½ channels are used for index recovery. Conversely, the pof and ffc link types use separate LS1 and LS2 channels, and multiplicative scrambling, to recover the index.

Moving to FIG. 50, the mmf data stream passes through rate transition buffers 'rtb1dn', 'rtb1up', 'rtb2dn' and 'rtb2up' before returning to the host XC interface in FIG. 49.

A rate transition buffer contains a small buffer CB in which the bits, coming in on port 1, are stored at the address given by the low order bits of the bit index 'idx', effectively creating a circular buffer.

At the same time there is an XC stream coming in on port 2, of which the bit index is recovered. For every bit received on port 2, an entry in the routing table R is looked up. Either this value is −1, and the bit is passed through to port 3, or else it refers to the entry in CB that will replace the bit in port 3.

At the top left of FIG. 50, the input for port 2 is a new, empty 125 Mbit/s XC stream that is synchronized to the mmf ring network. The new stream is filled with required channels such as LS1.P, LS2.P, . . . by 'rtb1dn', eventually forming the origin of the 'pof1' ring network segment. The bits of these channels are determined by the contents of the routing table R. Again, there is no hardware for establishing a link; the required data is transferred continuously from the host memory transmit buffer along with the data channels.

For 'rtb1dn' and 'rtb1up', the routing table configurations for this example are shown in table shown in FIG. 56. Again, XC addresses can be used to fill the R table entries. The actual configuration is done using the LBC.M.1 channel on the mmf ring network segment. In practice, the rate transition buffers also have bit offsets per R table entry, but this is not discussed in detail for the sake of not overcomplicating the example.

Since only bits are transferred, the memory requirements for CB and R are modest. For 'rtb1dn', CB has 512 1-bit entries, and R has 64 9-bit entries. For example, the first R definition from 'mmf' channel 070h to 'pof1' channel 0Ah effectively leads to the configuration software filling R entries 02h, 0Ah, 12h, 1Ah, 22h, 2Ah, 32h and 3Ah with 030h, 070h, 0D0h, 0F0h, 130h, 170h, 1 D0h and 1F0h, respectively. The order of the entries may be modified with the aforementioned offset in the definition.

For 'rtb1up', CB has 256 1-bit entries, and R has 2,048 8-bit entries. This is still less memory than typically needed for a packet-switched network solution. For example, the last R definition from 'pof1' channel 182h to 'mmf' channel C30h effectively leads to the configuration software filling a single R entry 430h with value 082h.

This example also shows how composite channels (such as 070h) are used to route a group of channels at the same time, keeping the configuration of the rate transition buffer blocks in a system straightforward and manageable. It is especially useful for transferring the synchronization channels for lower rate link types (LS1.C, LS2.C, . . . ).

As a side note, a key advantage of the use of multiple ring network segments is the ability of the network to continue operation without interruption even when network segments are failing. On the other hand, state-of-art field bus ring networks rely on the full integrity of a single ring network segment. In general, a full packet must actually become lost before appropriate action is taken to reconfigure the network to bypass the failing section.

Returning to the example, the EG1 channel, which had address 170h on the 'mmf' ring network segment, has now become 02Ah on the 'pof1' ring network segment. The bit rate, however, is obviously the same. For illustrative purposes only, a device 'dev1' is shown on the 'pof1' network, but it is unused and passive. It simply passes through the XC stream, except for LBC.P1, to which it responds as any other device, allowing the processing host to discover and configure it.

Similarly to what is implemented for connection of the 'pof1' to the 'mmf' ring network segment, the 'rtb3dn' and 'rtb3up' rate transition buffers are used to create the 'fcc' (flat cable copper) network. Again, the link rate is reduced from 125 Mbit/s by a factor of 8 to 15.625 Mbit/s.

For 'rtb3dn' and 'rtb3up', the routing table configurations for this example are shown in the table shown in FIG. 57.

Figures 58, 59:
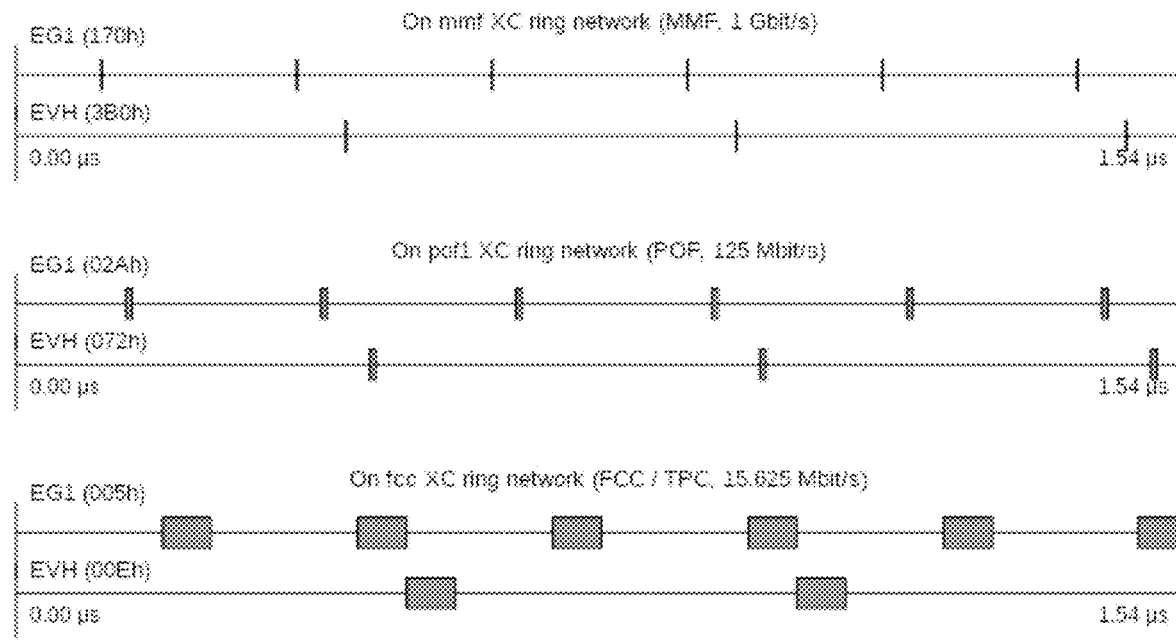
FIG. 58 shows the location of EG1 and EVH bits on mmf, pof1 and fcc XC ring networks.
FIG. 59 is a table representing XC channel allocations for device 'dev2'.

Again, a composite channel is used to route, amongst others, channel EG1 and EG2 to the 'fcc' ring network segment. On this segment, the EG1 address is 5h. FIG. 58 shows, on a common time scale, the first couple of bits of both EG1 and EVH on the three network segments 'mmf', 'pof1' and 'fcc'.

Clearly, the bits become wider as the XC stream bit rate decreases. Also shown is the optimal distribution in time of each channel, as well as the fact that the EVH bits do not collide with the EG1 bits on the 'fcc' network by design and definition of the XC addressing. Also, the delay of each bit from fastest to slowest network is very low. Finally, the EVH channel bit rate is clearly half of the EG1 channel bit rate.

Because the 'fcc' has a limited bit rate, it is not complicated to galvanically isolate it, providing also the isolation barrier required for the gate drivers 'dev2' and 'dev3'.

When the EG1 channel reaches device 'dev2', it will trigger the power transistor gate according to the planned scheduling for the next 8.192 μs frame. When the switching frequency is e.g. only 8 kHz (period is 125 us), on average 7 on 8 of the frames contain default data to actually schedule nothing and keep the gate driver output state unmodified. The writing of 8 EG1 words in the memory buffer is performed each cycle by the control algorithm through the driver. Normally, the driver would only update the EG1 words that need modification and leave the others in the default state. It would also clean up the transmitted EG1 words, avoiding the XC interface to re-transmit them when the transmit buffer wraps around while the control algorithm is stuck for some reason.

Similarly, the event channel EVH is processed, triggering an ADC conversion of the current shunt measurement. The controller host software is aware of the content of EVH, so it knows the timestamps of the ADC conversion, allowing it to determine the receive buffer section in which M1 contains the new measurement. In the time between, 'dev2' can simply update M1 in free-running mode for system monitoring or protection.

The table shown in FIG. 59 shows the configured channels for 'clev2'. Channels that are not mentioned, are simply passed through.

Device 'clev2' obviously needs EG1 and EVH, but requires also LS1, LS2 for synchronization and LBC for configuration. It also uses RT1 for real-time control and monitoring of gate driver functions by driver software on the controller host. Also, SFD and SFR are used to signal and detect system faults. As explained earlier, the current measurement is stored in channel M1.

Device 'dev3' operates similarly on EG2 and returns the dc bus voltage measurement as M2.

The 'rtb2dn' and 'rtb2up' rate transition buffers are used to connect the 125 Mbit/s 'pof2' to the 1 Gbit/s 'mmf' ring network segment. For 'rtb2dn' and 'rtb2up', the routing table configurations are shown in the table shown in FIG. 60.

Again, a composite channel 090h on 'mmf' is used to route the M3 and M4 measurements.

Device 'dev4' uses the same EVH channel as was used by 'dev2' and 'dev3' for triggering the ADCs after which the result is returned using M3 and M4. In addition, since this is a high-performance measurement, the device 'clev4' likely also uses EVL for an improved resolution of the sampling instant (0.5 ns instead of 8 ns). Since the bit rate on 'pof2' is 4 ns, the PLL in 'dev4' is required for effective use of EVL.

The table shown in FIG. 61 shows the configured channels for 'dev4'. Channels that are not mentioned, are simply passed through.

Eventually, M3 and M4 are routed back from 'pof2' to 'mmf' using 'rtb2up', then they are remapped into the section buffer SB in the controller host XC interface on the left side of FIG. 49, and eventually written back to the host memory receive buffer. Upon the next timer interrupt, the measurements M1 . . . 4 are picked up by the control algorithm and a new cycle starts.

Closing Remark

While the invention has been described hereinabove with reference to specific embodiments, this has been done to clarify and not to limit the invention, the scope of which is to be determined with reference to the accompanying claims.

The invention claimed is:

1. A real-time data communication system, comprising:
 a plurality of stations communicatively interconnected by a set of physical links forming a ring, operating at a base symbol rate, such that each of said stations has a physical upstream link and a physical downstream link and is configured to relay symbols received on its upstream link and originating from a different station to its downstream link;
 wherein a plurality of logical links are provided on said ring, each of said logical links being associated with a symbol rate divisor from among a set of symbol rate divisors and a link index, wherein said set of symbol rate divisors comprises only powers of 2;
 wherein each of said stations is configured to transmit a message represented by a first string of symbols on a selected logical link from among said plurality of logical links by:
  transmitting said message on its downstream link at said base symbol rate divided by the symbol rate divisor associated with said selected logical link, and offset by the link index of said selected logical link;
 wherein at least one of said stations is configured to generate a first synchronizing sequence by transmitting a predetermined repetitive sequence of symbols on its downstream link at said base symbol rate divided by the symbol rate divisor associated with a first logical link not used for data transmission, and offset by the link index of said first logical link not used for data transmission, and to generate a second synchronizing sequence by transmitting encoded representations of a running symbol counter value on its downstream link at said base symbol rate divided by the symbol rate divisor associated with a second logical link not used for data transmission, and offset by the link index of said second logical link not used for data transmission;
 and wherein each of said stations is further configured to retrieve symbols belonging to a specific logical link from among a stream of symbols received on its upstream physical link by determining using the first and second synchronizing sequences, a link symbol index for each of said received symbols and then selecting only those symbols for which said determined link symbol index has a remainder equal to the link index of said desired logical link when divided by the symbol rate divisor associated with said desired logical link.

2. The real-time data communication system according to claim 1,
wherein said determining of said link symbol index comprises:
detecting said first synchronizing sequence so as to obtain a reference point for offsets used to distinguish logical links;
using said reference point for detecting said second synchronizing sequence so as to obtain said encoded representations of said running symbol counter value; and
decoding said encoded representations of said running symbol counter value to retrieve said link symbol index.

3. The real-time data communication system according to claim 1, wherein said symbols are binary symbols.

4. The real-time data communication system according to claim 1, wherein said transmitting of said message further comprises reversibly transforming said first string of symbols into a second string of symbols, said second string of symbols having higher entropy than said first string of symbols, and transmitting said second string of symbols.

5. The real-time data communication system according to claim 1, wherein at least one of said stations is a host configured to store a stream of symbols received on its upstream physical link in a host buffer, and to apply an address translation table to said stored symbols so as to improve the spatial distribution of symbols belonging to selected logical links.

6. The real-time data communication system according to claim 1, wherein at least one of said stations is a host configured to read a stream of symbols from a host buffer for transmission on its downstream physical link, and to apply an address translation table to said read symbols so as to selectively combine symbols belonging to selected logical links.

7. The real-time communication system according to claim 1, wherein the real-time communication system corresponds to an electric energy conversion system comprising a central digital data processing unit, at least one power electronic converter, and a plurality of ports for connecting electric power sources and loads;
wherein said central digital data processing unit is connected to said at least one power electronic converter and said plurality of ports by means of a set of physical links forming a ring;
and wherein said central digital data processing unit, said at least one power electronic converter, and said plurality of ports are configured to operate as said plurality of stations of the real-time data communication system.

8. A method for exchanging data in a real-time data communication system:
wherein the real-time data communication system comprises a plurality of stations communicatively interconnected by a set of physical links forming a ring, operating at a base symbol rate, such that each of said stations has a physical upstream link and a physical downstream link and relays symbols received on its upstream link and originating from a different station to its downstream link, wherein a plurality of logical links are provided on said ring, each of said logical links being associated with a symbol rate divisor from among a set of symbol rate divisors and a link index, wherein said set of symbol rate divisors comprises only powers of 2;
the method comprising:
at each of said stations having a message represented by a first string of symbols to be transmitted on a selected logical link from among said plurality of logical links:
transmitting said message on its downstream link at said base symbol rate divided by the symbol rate divisor associated with said selected logical link, and offset by the link index of said selected logical link;
at least a first one of said stations:
generating a first synchronizing sequence by transmitting a predetermined repetitive sequence of symbols on its downstream link at said base symbol rate divided by the symbol rate divisor associated with a first logical link not used for data transmission, and offset by the link index of said first logical link not used for data transmission, and
generating a second synchronizing sequence by transmitting encoded representations of a running symbol counter value on its downstream link at said base symbol rate divided by the symbol rate divisor associated with a second logical link not used for data transmission, and offset by the link index of said second logical link not used for data transmission;
at least a second one of said stations:
retrieving symbols belonging to a specific logical link from among a stream of symbols received on its upstream physical link by determining using the first and second synchronizing sequences, a link symbol index for each of said received symbols and then selecting only those symbols for which said determined link symbol index has a remainder equal to the link index of said desired logical link when divided by the symbol rate divisor associated with said desired logical link.

9. The method according to claim 8
wherein said determining of said link symbol index comprises:
detecting said first synchronizing sequence so as to obtain a reference point for offsets used to distinguish logical links;
using said reference point for detecting said second synchronizing sequence so as to obtain said encoded representations of said running symbol counter value; and
decoding said encoded representations of said running symbol counter value to retrieve said link symbol index.

10. The method according to claim 8, wherein said symbols are binary symbols.

11. The method according to claim 8, wherein said transmitting of said message further comprises reversibly transforming said first string of symbols into a second string of symbols, said second string of symbols having higher entropy than said first string of symbols, and transmitting said second string of symbols.

12. The method according to claim 8, further comprising, at least one of said stations that acts as a host:
storing a stream of symbols received on its upstream physical link in a host buffer, and
applying an address translation table to said stored symbols so as to improve the spatial distribution of symbols belonging to selected logical links.

13. The method according to claim 8, further comprising, at least one of said stations that acts as a host:

reading a stream of symbols from a host buffer for transmission on its downstream physical link, and applying an address translation table to said read symbols so as to selectively combine symbols belonging to selected logical links.

14. The method according to claim 8, wherein the real-time data communication system corresponds to an electric energy conversion system comprising a central digital data processing unit, at least one power electronic converter, and a plurality of ports for connecting electric power sources and loads, said central digital data processing unit being connected to said at least one power electronic converter and said plurality of ports by means of a set of physical links forming a ring, wherein said central digital data processing unit, said at least one power electronic converter or internal components of said at least one power electronic converter, and said plurality of ports are configured to operate as said plurality of stations.

15. A non-transitory computer-readable memory medium, comprising:

program instructions that are executable to exchange data in a real-time data communication system comprising a plurality of stations communicatively interconnected by a set of physical links forming a ring, operating at a base symbol rate, such that each of said stations has a physical upstream link and a physical downstream link and relays symbols received on its upstream link and originating from a different station to its downstream link, wherein a plurality of logical links are provided on said ring, each of said logical links being associated with a symbol rate divisor from among a set of symbol rate divisors and a link index, wherein said set of symbol rate divisors comprises only powers of 2;

the program instructions executable to:

at each of said stations having a message represented by a first string of symbols to be transmitted on a selected logical link from among said plurality of logical links:

transmit said message on its downstream link at said base symbol rate divided by the symbol rate divisor associated with said selected logical link, and offset by the link index of said selected logical link;

at least a first one of said stations:

generate a first synchronizing sequence by transmitting a predetermined repetitive sequence of symbols on its downstream link at said base symbol rate divided by the symbol rate divisor associated with a first logical link not used for data transmission, and offset by the link index of said first logical link not used for data transmission, and generate a second synchronizing sequence by transmitting encoded representations of a running symbol counter value on its downstream link at said base symbol rate divided by the symbol rate divisor associated with a second logical link not used for data transmission, and offset by the link index of said second logical link not used for data transmission;

at least a second one of said stations:

retrieve symbols belonging to a specific logical link from among a stream of symbols received on its upstream physical link by determining using the first and second synchronizing sequences, a link symbol index for each of said received symbols and then selecting only those symbols for which said determined link symbol index has a remainder equal to the link index of said desired logical link when divided by the symbol rate divisor associated with said desired logical link.

16. The non-transitory computer-readable medium of claim 15, wherein said determining of said link symbol index comprises:

detecting said first synchronizing sequence so as to obtain a reference point for offsets used to distinguish logical links;

using said reference point for detecting said second synchronizing sequence so as to obtain said encoded representations of said running symbol counter value; and decoding said encoded representations of said running symbol counter value to retrieve said link symbol index.

17. The non-transitory computer-readable medium of claim 15, wherein said symbols are binary symbols.

18. The non-transitory computer-readable medium of claim 15, wherein the program instructions are further executable to:

reversibly transform said first string of symbols into a second string of symbols, said second string of symbols having higher entropy than said first string of symbols, and transmit said second string of symbols.

19. The non-transitory computer-readable medium of claim 15, where the program instructions are further executable to, at least one of said stations that acts as a host:

store a stream of symbols received on its upstream physical link in a host buffer, and apply an address translation table to said stored symbols so as to improve the spatial distribution of symbols belonging to selected logical links.

20. The non-transitory computer-readable medium of claim 15, where the program instructions are further executable to, at least one of said stations that acts as a host:

read a stream of symbols from a host buffer for transmission on its downstream physical link, and apply an address translation table to said read symbols so as to selectively combine symbols belonging to selected logical links.

* * * * *

UNITED STATES PATENT AND TRADEMARK OFFICE
CERTIFICATE OF CORRECTION

PATENT NO. : 11,411,768 B2
APPLICATION NO. : 17/047675
DATED : August 9, 2022
INVENTOR(S) : Jeroen Van den Keybus It is certified that error appears in the above-identified patent and that said Letters Patent is hereby corrected as shown below:

In the Claims

Claim 8, Column 44, Line 12, please add -- at -- before "at least a first one of said stations:"

Claim 8, Column 44, Line 27, please add -- at -- before "at least a second one of said stations:"

Claim 12, Column 44, Line 60, please add -- at -- before "at least one of said stations that acts as a host:"

Claim 13, Column 44, Line 67, please add -- at -- before "at least one of said stations that acts as a host:"

Claim 15, Column 45, Line 42, please add -- at -- before "at least a first one of said stations:"

Claim 15, Column 46, Line 3, please add -- at -- before "at least a second one of said stations:"

Claim 19, Column 46, Line 40, please add -- at -- after "able to," and before "at least one of said stations that acts as a host:"

Claim 20, Column 46, Line 48, please add -- at -- after "able to," and before "at least one of said stations that acts as a host:"

Signed and Sealed this
First Day of November, 2022

*Katherine Kelly Vidal*
Katherine Kelly Vidal
*Director of the United States Patent and Trademark Office*